United States Patent
Zhang et al.

(10) Patent No.: US 10,420,118 B2
(45) Date of Patent: Sep. 17, 2019

(54) MULTIFLOW WITH ANTENNA SELECTION

(71) Applicant: QUALCOMM Incorporated, San Diego, CA (US)

(72) Inventors: Xiaoxia Zhang, San Diego, CA (US); Ashok Mantravadi, San Diego, CA (US); Pranav Dayal, San Diego, CA (US); Gavin Bernard Horn, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1627 days.

(21) Appl. No.: 14/040,192

(22) Filed: Sep. 27, 2013

(65) Prior Publication Data

US 2015/0092573 A1 Apr. 2, 2015

(51) Int. Cl.
*H04W 72/10* (2009.01)
*H04W 24/10* (2009.01)
(Continued)

(52) U.S. Cl.
CPC ............ *H04W 72/10* (2013.01); *H04B 7/024* (2013.01); *H04B 7/0404* (2013.01);
(Continued)

(58) Field of Classification Search
CPC ..... H04W 24/10; H04W 72/10; H04W 88/06; H04W 72/1231; H04B 7/024; H04B 7/0404; H04B 7/0691; H04B 7/0617
See application file for complete search history.

(56) References Cited

U.S. PATENT DOCUMENTS 8,265,699 B2 9/2012 Khojastepour
8,427,978 B2 4/2013 Xiao
(Continued)

FOREIGN PATENT DOCUMENTS

CN 101095296 A 12/2007
CN 101361289 A 2/2009
(Continued)

OTHER PUBLICATIONS

ISA/EPO, International Search Report and Written Opinion of the International Searching Authority, Int'l App. No. PCT/US2014/056333, dated Dec. 4, 2014, European Patent Office, Rijswijk, NL, 13 pgs.

*Primary Examiner* — Mandish K Randhawa
(74) *Attorney, Agent, or Firm* — Holland & Hart LLP/Qualcomm

(57) ABSTRACT

Optimizing multiflow performance and priority across UEs and networks including receive antenna selection at the UEs, CSI measurement and reporting, and scheduling for multiflow operation. The techniques may evaluate channel conditions for a UE for multiple access points and different combinations of antennas and determine how the UE should feedback CSI for transmissions from the multiple access points. The disclosed techniques also include techniques for scheduling transmissions from the multiple access points using the CSI information to optimize multiflow performance and priority across UEs and networks. Various scheduling modes use feedback from UEs including the maximum supported rates for each link and/or rates based on the maximum sum capacity of the links used concurrently. The scheduler may maintain separate priority lists for each access point or a single priority list across both access points. The techniques may be used for multiflow operation using LTE and WLAN links.

57 Claims, 19 Drawing Sheets

(51) Int. Cl.
  *H04B 7/024*   (2017.01)
  *H04B 7/0404*  (2017.01)
  *H04B 7/06*        (2006.01)
  *H04W 72/12*       (2009.01)
  *H04W 88/06*       (2009.01)

(52) U.S. Cl.
  CPC .......... *H04B 7/0691* (2013.01); *H04W 24/10* (2013.01); *H04B 7/0617* (2013.01); *H04W 72/1231* (2013.01); *H04W 88/06* (2013.01)

(56) References Cited

U.S. PATENT DOCUMENTS

| | | | |
|---|---|---|---|
| 8,432,828 B2 | 4/2013 | Ihm et al. | |
| 2006/0234777 A1* | 10/2006 | Vannithamby | H04B 7/0491 455/562.1 |
| 2007/0253388 A1* | 11/2007 | Pietraski | H04J 13/00 370/338 |
| 2008/0051037 A1* | 2/2008 | Molnar | H04B 7/0632 455/70 |
| 2010/0260234 A1 | 10/2010 | Thomas et al. | |
| 2010/0284345 A1* | 11/2010 | Rudrapatna | H04W 72/082 370/329 |
| 2010/0323611 A1 | 12/2010 | Choudhury | |
| 2012/0140848 A1* | 6/2012 | Lin | H04B 7/0413 375/296 |
| 2013/0088983 A1 | 4/2013 | Pragada et al. | |
| 2013/0329664 A1* | 12/2013 | Kim | H04W 24/10 370/329 |

FOREIGN PATENT DOCUMENTS

| | | |
|---|---|---|
| EP | 2242187 A1 | 10/2010 |
| JP | 2010510692 A | 4/2010 |
| JP | 2011518448 A | 6/2011 |
| JP | 2012156974 A | 8/2012 |
| WO | WO-2006063138 A2 | 6/2006 |
| WO | WO-2008126655 A2 | 10/2008 |
| WO | WO-2009136658 A2 | 11/2009 |
| WO | WO-2011084715 A1 | 7/2011 |

* cited by examiner

| Antenna Hypothesis | Antenna Subsets | |
|---|---|---|
| | LTE | WLAN |
| A | $k_{15}$ | $\emptyset$ |
| B | $k_{14}$ | $k_1$ |
| C | $k_{13}$ | $k_2$ |
| D | $k_{12}$ | $k_3$ |
| E | $k_{11}$ | $k_4$ |
| F | $k_{10}$ | $k_5$ |
| G | $k_9$ | $k_6$ |
| H | $k_8$ | $k_7$ |
| I | $k_7$ | $k_8$ |
| J | $k_6$ | $k_9$ |
| K | $k_5$ | $k_{10}$ |
| L | $k_4$ | $k_{11}$ |
| M | $k_3$ | $k_{12}$ |
| N | $k_2$ | $k_{13}$ |
| O | $k_1$ | $k_{14}$ |
| P | $\emptyset$ | $k_{15}$ |

FIG. 9

MULTIFLOW WITH ANTENNA SELECTION

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations or Node-Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

In some wireless communication systems, a user equipment (UE) may be capable of supporting concurrent connections with multiple access points using techniques which may be referred to as multiflow operation. The multiple access points may be associated with the same or different radio access technologies (RATs). For example, a UE may be simultaneously connected to a wireless local area network (WLAN) and a Long Term Evolution (LTE) or LTE-Advanced (LTE-A) network.

The networks may support techniques for utilizing feedback from the UE in adapting communication links to channel conditions seen by the UE. For example, the UE may report channel state information (CSI) to each network and the networks may adapt various communication parameters used for communication over the links. The adapted communication parameters may include, for example, modulation and coding scheme (MCS), rank, and precoding for downlink transmissions.

The base station and the UE may each use multiple antennas when communicating with each other. Multiple antennas at the base station and UE may be used to take advantage of antenna diversity schemes that may improve communication quality and reliability. There are different types of techniques that may be used to implement an antenna diversity scheme. For example, transmit diversity may be applied to increase the signal to noise ratio (SNR) at the receiver for a single data stream. Spatial diversity may be applied to increase the data rate by transmitting multiple independent streams using multiple antennas. Receive diversity may be used to combine signals received at multiple receive antennas to improve received signal quality and increase resistance to fading. Multiple antenna technologies for communicating multiple data streams may be known as multiple-input multiple-output (MIMO) communications.

SUMMARY

Methods and apparatuses are described for optimizing multiflow performance and priority across UEs and networks. Multiflow management may include receive antenna selection at the UEs, CSI measurement and reporting, and scheduling for multiflow operation. The techniques may evaluate channel conditions for a UE for multiple access points and different combinations of antennas and determine how the UE should feedback CSI for transmissions from the multiple access points. The disclosed techniques also include techniques for scheduling transmissions from the multiple access points using the CSI information to optimize multiflow performance and priority across UEs and networks.

The disclosed techniques may use a central scheduler for performing prioritization and scheduling for a UE in multiflow operation with LTE and WLAN networks. The central scheduler may perform prioritization at the bearer level or the UE logical channel level. For example, the central scheduler may form a prioritized list of UE logical channels of the UEs to be scheduled for each scheduling interval. Prioritized lists may include an ordering based on the UEs to be scheduled and a quality of service (QoS) associated with the respective UE logical channels. The central scheduler may use a variety of options for prioritizing UE logical channels for multiple UEs across multiple access points based on CSI feedback from the UEs.

In a first scheduling mode, the central scheduler may determine separate priorities for the first and second links based on a maximum sum capacity of the LTE and WLAN links. In a second scheduling mode, the central scheduler may maintain a single priority list across both the LTE eNB and WLAN AP based on the maximum sum capacity of the LTE and WLAN links and may perform wideband scheduling across the access points. In a third scheduling mode, the central scheduler may use orthogonal scheduling between the LTE eNB and WLAN AP. In a fourth scheduling mode, the central scheduler maintains individual priority lists for the LTE and WLAN networks and schedules UEs based on optimizing multiflow performance taking into account the supported communication rates for each of three receive configurations for each UE: using the LTE link only, using the WLAN link only, or using both WLAN and LTE links concurrently.

Some embodiments are directed to a method for communication performed by a UE having two or more antennas, where the method includes identifying a first set of antenna subsets of the two or more antennas for communication with a first access point over a first communication channel, identifying a second set of antenna subsets of the two or more antennas for communication with a second access point over a second communication channel, determining channel estimates for the first communication channel for the first set of antenna subsets and for the second communication channel for the second set of antenna subsets, reporting channel rate information based at least in part on the determined channel estimates, wherein the reporting comprises at least one of reporting a first channel rate based on a maximum rate for the first communication channel and the first set of antenna subsets, reporting a second channel rate based on a maximum rate for the second communication channel and the second set of antenna subsets, reporting a third channel rate of the first communication channel using a first antenna subset, or reporting a fourth channel rate of the second communication channel using a second antenna subset different from the first antenna subset, or a combination thereof, wherein the third channel rate and the fourth channel rate are based on a maximum sum capacity of the first and second communication channels using the first and second antenna subsets, respectively, receiving at least one transmission over at least one of the first communication channel or the second communication channel based on the reported channel rate information. In some embodiments, the method includes sending an indicator of a capability of receiving the first communication channel using the first antenna subset and the second communication channel using the second antenna subset concurrently. In some examples, the first access point is an LTE/LTE-A eNB and the second access point is a WLAN access point.

In some embodiments, the reporting includes reporting the third channel rate of the first communication channel to the first access point. The method may include determining a first loading weight for the first access point and a second loading weight for the second access point and determining the maximum sum capacity of the first and second communication channels further based on the first and second loading weights.

In some embodiments, the reporting includes reporting the first channel rate for the first communication channel to the first access point and the first channel rate for the first communication channel is associated with a third antenna subset associated with the maximum rate of the first communication channel. The receiving the at least one transmission may include receiving transmissions from the first access point in first time intervals using the third antenna subset and receiving transmissions from the second access point in second time intervals different from the first time intervals using a fourth antenna subset associated with the maximum rate of the second communication channel.

In some embodiments, the reporting includes reporting the first channel rate and the third channel rate of the first communication channel to the first access point. The reporting may include reporting the second channel rate and the fourth channel rate of the second communication channel to the second access point. The receiving the at least one transmission may include receiving an antenna selection indicator from the first access point, the antenna selection indicator indicating one of an antenna receive configuration, an antenna subset index, or an antenna subset size, or a combination thereof and determining an antenna subset for receiving the at least one transmission based at least in part on the antenna selection indicator. The antenna selection indicator may be received, for example, in one of control information or a configuration message.

Some embodiments are directed to a method including receiving channel rate information for a first communication channel between a first access point and a UE and a second communication channel between a second access point and the UE, wherein the channel rate comprises at least one of a first channel rate based on a maximum rate for the first communication channel, a second channel rate based on a maximum rate for the second communication channel, a third channel rate of the first communication channel, or a fourth channel rate of the second communication channel, or a combination thereof, wherein the third channel rate and fourth channel rate are based on a maximum sum capacity of the first and second communication channels using a first antenna subset and a second, different antenna subset, respectively, determining a scheduling priority metric for the UE for the first and second communication channels based at least in part on the received channel rate, and scheduling communications between at least one of the first access point or the second access point and the UE based on the determined scheduling priority metric. The method may include receiving an indicator of a capability of receiving the first communication channel using the first antenna subset and the second communication channel using the second antenna subset concurrently In some embodiments, the received channel rate includes the third channel rate for the first communication channel, and determining the scheduling priority metric includes determining a first scheduling priority metric for the UE for the first access point and determining a second scheduling priority metric for the UE for the second access point independently of the first scheduling priority metric.

In some embodiments, the received channel rate includes the third channel rate for the first communication channel, and the scheduling includes scheduling communications between the first and second access points and the UE simultaneously. In some embodiments, the received channel rate includes the first channel rate for the first communication channel, and the scheduling includes scheduling communications between the first and second access points and the UE using orthogonal resources.

In some embodiments, the received channel rate includes the first channel rate and the third channel rate for the first communication channel, and determining the scheduling priority metric for the UE comprises determining, for each of the first and second access points, a first scheduling priority metric for the first communication channel, a second scheduling priority metric for the second communication channel, and a third scheduling priority metric for concurrent use of the first and second communication channels.

In some embodiments, the method includes identifying an antenna subset metric for the UE for receiving the scheduled communications, the antenna subset metric comprising one of an antenna receive configuration, an antenna subset index, or an antenna subset size, or a combination thereof, and sending the antenna subset metric to the UE for antenna selection for the scheduled communications.

Some embodiments are directed to an apparatus for wireless communication including means for identifying, for a UE having two or more antennas, first and second sets of antenna subsets of the two or more antennas, the first and second sets of antenna subsets for communication with a first access point over a first communication channel and with a second access point over a second communication channel, respectively, means for determining channel estimates for the first communication channel for the first set of antenna subsets and for the second communication channel for the second set of antenna subsets, means for reporting channel rate information based at least in part on the determined channel estimates, wherein the reporting comprises at least one of reporting a first channel rate based on a maximum rate for the first communication channel and the first set of antenna subsets, reporting a second channel rate based on a maximum rate for the second communication channel and the second set of antenna subsets, reporting a third channel rate of the first communication channel using a first antenna subset, or reporting a fourth channel rate of the second communication channel using a second antenna subset different from the first antenna subset, or a combination thereof, wherein the third channel rate and the fourth channel rate are based on a maximum sum capacity of the first and second communication channels using the first and second antenna subsets, respectively, and means for receiving at least one transmission over at least one of the first communication channel or the second communication channel based on the reported channel rate information. In some embodiments, the apparatus includes means for sending an indicator of a capability of receiving the first communication channel using the first antenna subset and the second communication channel using the second antenna subset concurrently. In some examples, the first access point is an LTE/LTE-A eNB and the second access point is a WLAN access point.

In some embodiments, the means for reporting reports the third channel rate of the first communication channel to the first access point. The apparatus may include means for determining a first loading weight for the first access point and a second loading weight for the second access point, and means for determining the maximum sum capacity of the first and second communication channels further based on the first and second loading weights.

In some embodiments, the means for reporting reports the first channel rate for the first communication channel to the first access point, the first channel rate for the first communication channel associated with a third antenna subset. The means for receiving the at least one transmission may receive transmissions from the first access point in first time intervals using the third antenna subset, and receive transmissions from the second access point in second time intervals different from the first time intervals using a fourth antenna subset associated with the second channel rate.

In some embodiments, the means for reporting reports the first channel rate and the third channel rate of the first communication channel to the first access point. The means for receiving the at least one transmission may receive an antenna selection indicator from the first access point, the antenna selection indicator indicating one of an antenna receive configuration, an antenna subset index, or an antenna subset size, or a combination thereof, and the means for identifying the first and second antenna subsets may determine an antenna subset for receiving the at least one transmission based at least in part on the antenna selection indicator. The antenna selection indicator may be received, for example, in one of control information or a configuration message.

Some embodiments are directed to an apparatus for wireless communications including means for receiving channel rate information for a first communication channel between a first access point and a UE and a second communication channel between a second access point and the UE, wherein the channel rate comprises at least one of a first channel rate based on a maximum rate for the first communication channel, a second channel rate based on a maximum rate for the second communication channel, a third channel rate of the first communication channel, or a fourth channel rate of the second communication channel, or a combination thereof, wherein the third channel rate and fourth channel rate are based on a maximum sum capacity of the first and second communication channels, means for determining a scheduling priority metric for the UE for the first and second communication channels based at least in part on the received channel rate information, and means for scheduling communications between at least one of the first access point or the second access point and the UE based on the determined scheduling priority metric. In some embodiments, the means for receiving receives an indicator of a capability of receiving the first communication channel using the first antenna subset and the second communication channel using the second antenna subset concurrently.

In some embodiments, the received channel rate information includes the third channel rate for the first communication channel, and the means for determining the scheduling priority metric determines a first scheduling priority metric for the UE for the first access point and determines a second scheduling priority metric for the UE for the second access point independently of the first scheduling priority metric.

In some embodiments, the received channel rate information includes the third channel rate for the first communication channel, and wherein the means for scheduling schedules communications between the first and second access points and the UE simultaneously. In some embodiments, the received channel rate information includes the first channel rate for the first communication channel, and the means for scheduling schedules communications between the first and second access points and the UE using orthogonal resources.

In some embodiments, the received channel rate information includes the first channel rate and the third channel rate for the first communication channel, and the means for determining the scheduling priority metric for the UE determines, for each of the first and second access points, a first scheduling priority metric for the first communication channel, a second scheduling priority metric for the second communication channel, and a third scheduling priority metric for concurrent use of the first and second communication channels.

In some embodiments, the apparatus includes means for identifying an antenna subset metric for the UE for receiving the scheduled communications, the antenna subset metric comprising one of an antenna receive configuration, an antenna subset index, or an antenna subset size, or a combination thereof, and means for sending the antenna subset metric to the UE for antenna selection for the scheduled communications.

Some embodiments are directed to a device for wireless communication including a processor and a memory in electronic communication with the processor, the memory embodying instructions, the instructions being executable by the processor to identify, for a user equipment having two or more antennas, a first set of antenna subsets for communication with a first access point over a first communication channel, identify a second set of antenna subsets of the two or more antennas for communication with a second access point over a second communication channel, determine channel estimates for the first communication channel for the first set of antenna subsets and for the second communication channel for the second set of antenna subsets, report channel rate information based at least in part on the determined channel estimates, wherein the reporting comprises at least one of reporting a first channel rate based on a maximum rate for the first communication channel and the first set of antenna subsets, reporting a second channel rate based on a maximum rate for the second communication channel and the second set of antenna subsets, reporting a third channel rate of the first communication channel using a first antenna subset, or reporting a fourth channel rate of the second communication channel using a second antenna subset different from the first antenna subset, or a combination thereof, wherein the third channel rate and the fourth channel rate are based on a maximum sum capacity of the first and second communication channels using the first and second antenna subsets, respectively, and receive at least one transmission over at least one of the first communication channel or the second communication channel based on the reported channel rate information.

In some embodiments, the memory includes instructions executable by the processor to report the third channel rate of the first communication channel to the first access point. The memory may include instructions executable by the processor to determine a first loading weight for the first access point and a second loading weight for the second access point, and determine the maximum sum capacity of the first and second communication channels further based on the first and second loading weights.

In some embodiments, the memory includes instructions executable by the processor to report the first channel rate for the first communication channel to the first access point, the first channel rate for the first communication channel associated with a third antenna subset associated with the maximum rate of the first communication channel, receive transmissions from the first access point in first time intervals using the third antenna subset, and receive transmissions from the second access point in second time intervals different from the first time intervals using a fourth antenna subset associated with the maximum rate of the second communication channel.

In some embodiments, the memory includes instructions executable by the processor to report the first channel rate and the third channel rate of the first communication channel to the first access point. The memory may include instructions executable by the processor to receive an antenna selection indicator from the first access point, the antenna selection indicator indicating one of an antenna receive configuration, an antenna subset index, or an antenna subset size, or a combination thereof, and determine an antenna subset for receiving the at least one transmission based at least in part on the antenna selection indicator.

Some embodiments are directed to a device for wireless communication including a processor and a memory in electronic communication with the processor, the memory embodying instructions, the instructions being executable by the processor to receive channel rate information for a first communication channel between a first access point and a UE and a second communication channel between a second access point and the UE, wherein the channel rate comprises at least one of a first channel rate based on a maximum rate for the first communication channel, a second channel rate based on a maximum rate for the second communication channel, a third channel rate of the first communication channel, or a fourth channel rate of the second communication channel, or a combination thereof, wherein the third channel rate and fourth channel rate are based on a maximum sum capacity of the first and second communication channels, determine a scheduling priority metric for the UE for the first and second communication channels based at least in part on the received channel rate, and schedule communications between at least one of the first access point or the second access point and the UE based on the determined scheduling priority metric.

In some embodiments, the received channel rate includes the third channel rate for the first communication channel, and the memory includes instructions executable by the processor to determine a first scheduling priority metric for the UE for the first access point and determine a second scheduling priority metric for the UE for the second access point independently of the first scheduling priority metric.

In some embodiments, the received channel rate includes the third channel rate for the first communication channel, and the memory includes instructions being executable by the processor to schedule communications between the first and second access points and the UE simultaneously. In some embodiments, the received channel rate includes the first channel rate for the first communication channel, and the memory includes instructions executable by the processor to schedule communications between the first and second access points and the UE using orthogonal resources.

In some embodiments, the received channel rate includes the first channel rate and the third channel rate for the first communication channel, and the memory includes instructions being executable by the processor to determine, for each of the first and second access points, a first scheduling priority metric for the first communication channel, a second scheduling priority metric for the second communication channel, and a third scheduling priority metric for concurrent use of the first and second communication channels.

In some embodiments, the memory includes instructions executable by the processor to identify an antenna subset metric for the UE for receiving the scheduled communications, the antenna subset metric including one of an antenna receive configuration, an antenna subset index, or an antenna subset size, or a combination thereof, and to send the antenna subset metric to the UE for antenna selection for the scheduled communications.

Some embodiments are directed to a computer program product for wireless communication including a non-transitory computer-readable medium, including code for identifying, for a UE having two or more antennas, a first set of antenna subsets of the two or more antennas for communication with a first access point over a first communication channel, identifying a second set of antenna subsets of the two or more antennas for communication with a second access point over a second communication channel, determining channel estimates for the first communication channel for the first set of antenna subsets and for the second communication channel for the second set of antenna subsets, reporting channel rate information based at least in part on the determined channel estimates, wherein the reporting comprises at least one of reporting a first channel rate based on a maximum rate for the first communication channel and the first set of antenna subsets, reporting a second channel rate based on a maximum rate for the second communication channel and the second set of antenna subsets, reporting a third channel rate of the first communication channel using a first antenna subset, or reporting a fourth channel rate of the second communication channel using a second antenna subset different from the first antenna subset, or a combination thereof, wherein the third channel rate and the fourth channel rate are based on a maximum sum capacity of the first and second communication channels using the first and second antenna subsets, respectively, and receiving at least one transmission over at least one of the first communication channel or the second communication channel based on the reported channel rate information.

In some embodiments, the non-transitory computer-readable medium includes code for reporting the third channel rate of the first communication channel to the first access point. The non-transitory computer-readable medium may include code for determining a first loading weight for the first access point and a second loading weight for the second access point and determining the maximum sum capacity of the first and second communication channels further based on the first and second loading weights.

In some embodiments, the non-transitory computer-readable medium includes code for reporting the first channel rate for the first communication channel to the first access point, the first channel rate for the first communication channel associated with a third antenna subset associated with the maximum rate of the first communication channel, receiving transmissions from the first access point in first time intervals using the third antenna subset, and receiving transmissions from the second access point in second time intervals different from the first time intervals using a fourth antenna subset associated with the maximum rate of the second communication channel.

In some embodiments, the non-transitory computer-readable medium includes code for reporting the first channel rate and the third channel rate of the first communication channel to the first access point. The non-transitory computer-readable medium may include code for receiving an antenna selection indicator from the first access point, the antenna selection indicator indicating one of an antenna receive configuration, an antenna subset index, or an antenna subset size, or a combination thereof, and determining an antenna subset for receiving the at least one transmission based at least in part on the antenna selection indicator.

Some embodiments are directed to a computer program product for wireless communication including a non-transitory computer-readable medium, including code for receiving channel rate information for a first communication channel between a first access point and a UE and a second communication channel between a second access point and the UE, wherein the channel rate comprises at least one of a first channel rate based on a maximum rate for the first communication channel, a second channel rate based on a maximum rate for the second communication channel, a third channel rate of the first communication channel, or a fourth channel rate of the second communication channel, or a combination thereof, wherein the third channel rate and fourth channel rate are based on a maximum sum capacity of the first and second communication channels, determining a scheduling priority metric for the UE for the first and second communication channels based at least in part on the received channel rate, and scheduling communications between at least one of the first access point or the second access point and the UE based on the determined scheduling priority metric. In some embodiments, the non-transitory computer-readable medium includes code for identifying an antenna subset metric for the UE for receiving the scheduled communications, the antenna subset metric comprising one of an antenna receive configuration, an antenna subset index, or an antenna subset size, or a combination thereof, and sending the antenna subset metric to the UE for antenna selection for the scheduled communications.

In some embodiments, the received channel rate includes the third channel rate for the first communication channel, and the non-transitory computer-readable medium includes code for determining a first scheduling priority metric for the UE for the first access point and determining a second scheduling priority metric for the UE for the second access point independently of the first scheduling priority metric.

In some embodiments, the received channel rate includes the third channel rate for the first communication channel, and the non-transitory computer-readable medium includes code for scheduling communications between the first and second access points and the UE simultaneously. In some embodiments, the received channel rate includes the first channel rate for the first communication channel, and the computer-readable medium includes code for scheduling communications between the first and second access points and the UE using orthogonal resources.

In some embodiments, the received channel rate includes the first channel rate and the third channel rate for the first communication channel, and the non-transitory computer-readable medium further comprises code for determining, for each of the first and second access points, a first scheduling priority metric for the first communication channel, a second scheduling priority metric for the second communication channel, and a third scheduling priority metric for concurrent use of the first and second communication channels.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 9 shows a table of example antenna configurations for concurrently receiving multiple links;

DETAILED DESCRIPTION

Figure 1:
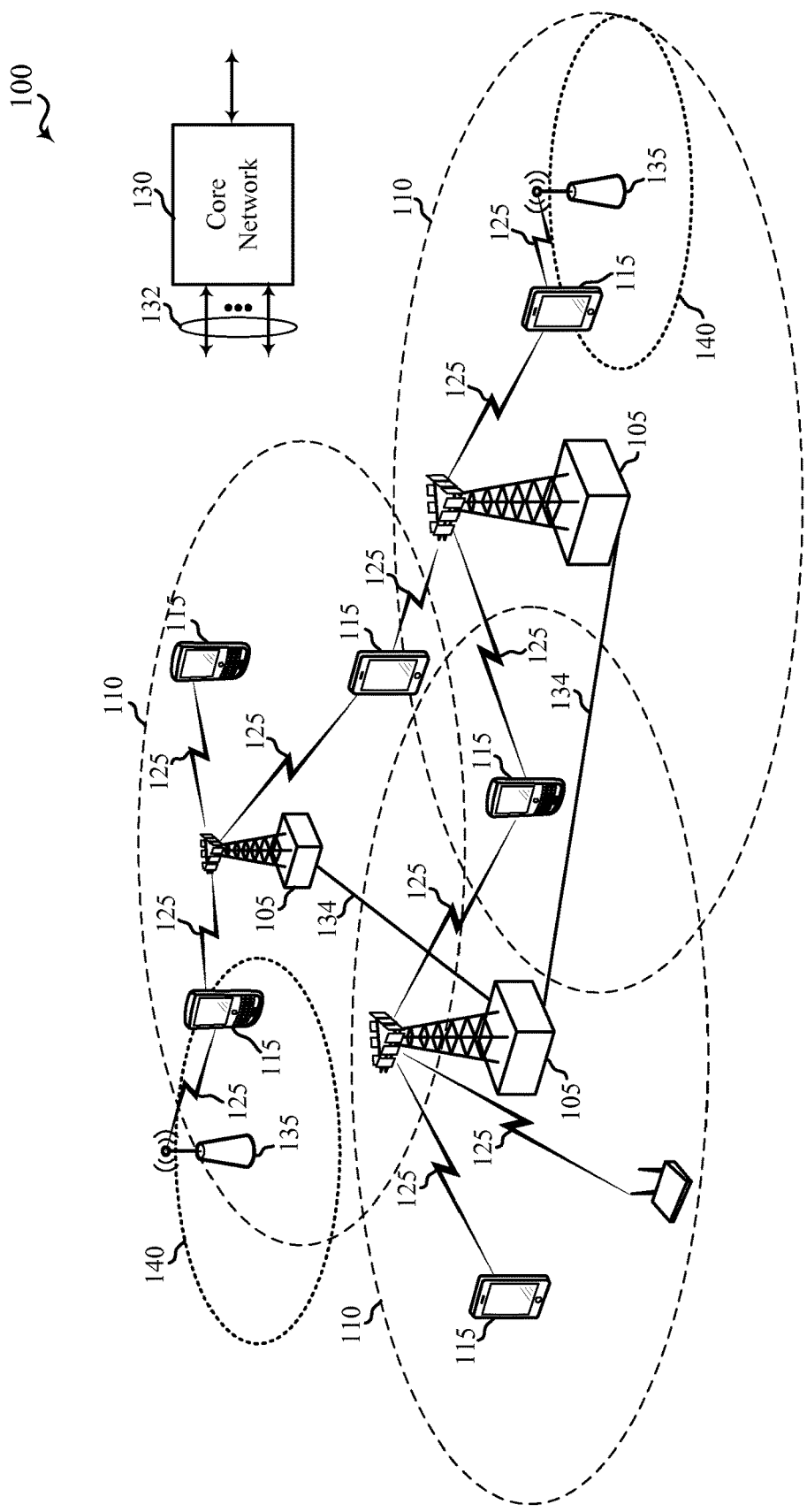
FIG. 1 shows a diagram of an example of a wireless communications system.

Described embodiments are directed to systems and methods for optimizing multiflow performance and priority across UEs and networks. Multiflow management may include receive antenna selection at the UEs, CSI measurement and reporting, and scheduling for multiflow operation. The techniques may evaluate channel conditions for a UE for multiple access points and different combinations of antennas and determine how the UE should feedback CSI for transmissions from the multiple access points. The disclosed techniques also include techniques for scheduling transmissions from the multiple access points using the CSI information to optimize multiflow performance and priority across UEs and networks.

The disclosed techniques may use a central scheduler for performing prioritization and scheduling for a UE in multiflow operation with LTE and WLAN networks. The central scheduler may perform prioritization at the bearer level or the UE logical channel level. For example, the central scheduler may form a prioritized list of UE logical channels of the UEs to be scheduled for each scheduling interval. Prioritized lists may include an ordering based on the UEs to be scheduled and a quality of service (QoS) associated with the respective UE logical channels. The central scheduler may use a variety of options for prioritizing UE logical channels for multiple UEs across multiple access points based on CSI feedback from the UEs.

In a first scheduling mode, the central scheduler may determine separate priorities for the first and second links based on a maximum sum capacity of the LTE and WLAN links. In a second scheduling mode, the central scheduler may maintain a single priority list across both the LTE eNB and WLAN AP based on the maximum sum capacity of the LTE and WLAN links and may perform wideband scheduling across the access points. In a third scheduling mode, the central scheduler may use orthogonal scheduling between the LTE eNB and WLAN AP. In a fourth scheduling mode, the central scheduler maintains individual priority lists for the LTE and WLAN networks and schedules UEs based on optimizing multiflow performance taking into account the supported communication rates for each of three receive configurations for each UE: using the LTE link only, using the WLAN link only, or using both WLAN and LTE links concurrently.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 includes one or more WLAN or Wi-Fi networks such as IEEE 802.11 networks. WLAN networks may include one or more access points (AP) 135. The devices 115 may be capable of connecting to the WLAN networks via the access points 135. Each WLAN AP 135 has a coverage area 140 such that devices 115 within that area can typically communicate with the WLAN AP 135. When referring to the WLAN network, the devices 115 may be referred to as wireless stations, stations (STAs), or mobile stations (MSs). Although not shown in FIG. 1, a device 115 can be covered by more than one WLAN AP 135 and can therefore associate with different APs at different times depending on which one provides a more suitable connection. A single access point 135 and an associated set of stations 115 may be referred to as a basic service set (BSS). An extended service set (ESS) is a set of connected BSSs and a distribution system (DS) (not shown) is used to connect access points in an extended service set.

In embodiments, the system 100 includes an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless network 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

The transmission links 125 shown in network 100 may include uplink (UL) transmissions from a mobile device 115 to a base station 105 or WLAN AP 135, and/or downlink (DL) transmissions, from a base station 105 or WLAN AP 135 to a mobile device 115. The downlink transmissions may also be called forward link transmissions while the uplink transmissions may also be called reverse link transmissions. In some embodiments of the system 100, base stations 105, WLAN APs 135, and/or mobile devices 115 may include multiple antennas for employing antenna diversity schemes to improve communication quality and reliability between the access points 105, 135 and mobile devices 115. Additionally or alternatively, access points 105, 135 and/or mobile devices 115 may employ multiple-input, multiple-output (MIMO) techniques as described in more detail below.

UEs 115 may be multi-mode devices and may be capable of concurrently supporting connections with different radio access technologies (RATs) which may be called multiflow operation. For example, UEs 115 may be capable of establishing and maintaining concurrent links including transmitting and receiving communications with both an LTE eNB 105 and a WLAN access point 135 at the same time. The system 100 may be configured to manage multiflow communications at the packet or bearer levels. For packet-level multiflow operation, a single RLC layer may be maintained for a UE 115 that provides packets to be transmitted over both the LTE and the WLAN RATs. In bearer-level multiflow operation, individual bearers established for the UE 115 may be assigned to either the LTE or the WLAN networks and the bearers may provide packets for their assigned links. In certain examples, one or more LTE eNBs 105 may be colocated with one or more WLAN access points 135.

Figure 2:
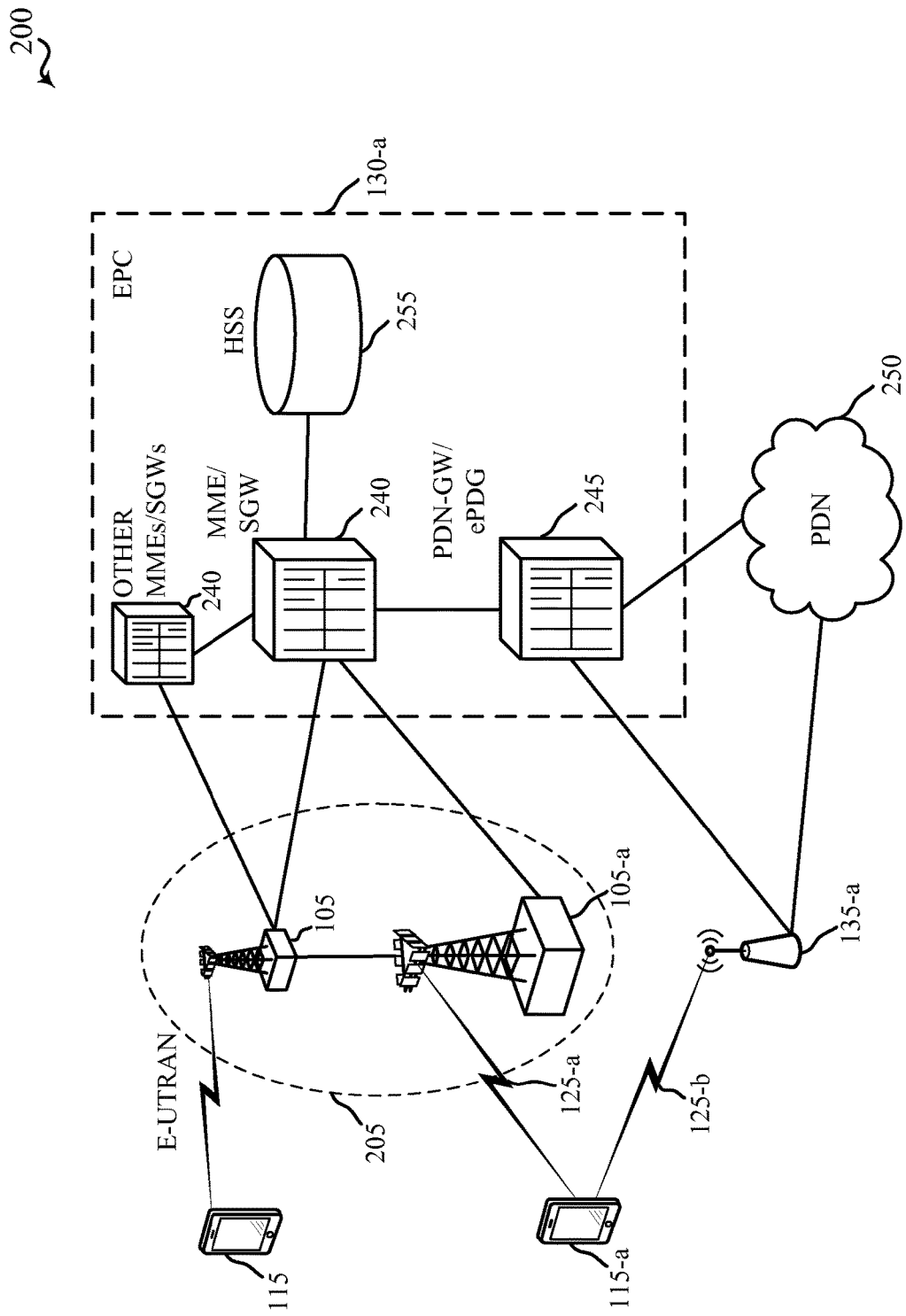
FIG. 2 shows a diagram of an example of a wireless communications system.

Referring now to FIG. 2, a diagram of a wireless communication system 200 is shown. The wireless communication system 200 may include one or more LTE/LTE-A networks and one or more WLAN networks with overlapping coverage areas. The LTE/LTE-A network may include an evolved packet core (EPC) 130-*a* and one or more eNBs 105 making up an E-UTRAN 205. The WLAN network may include one or more WLAN APs 135.

The UEs 115 may be capable of communicating with a packet data network (PDN) 250 via the LTE/LTE-A network or the WLAN network. The PDN(s) 250 may include the Internet, an Intranet, an IP Multimedia Subsystem (IMS), a Packet-Switched (PS) Streaming Service (PSS), and/or other types of PDNs.

The evolved packet core 130-*a* may include a number of mobility management entity/serving gateway (MME/SGW) nodes 240 and a number of packet data network (PDN) gateways (PDN-GWs)/evolved packet data gateways 245.

Each of the MME/SGW nodes 240 may implement both a mobile management entity (MME) and a serving gateway (SGW), as defined by the Evolved Packet System (EPS) architecture standardized by the 3GPP organization. Alternatively, the MMEs and SGWs may be implemented by separate devices. The MME may be the control node that processes the signaling between the UEs 115 and the EPC 130-a. Generally, the MME may provide bearer and connection management in connection with the HSS 255. The HSS 255 is a database that contains user-related and subscriber-related information. It also provides support functions in mobility management, call and session setup, user authentication and access authorization. The MME may, therefore, be responsible for idle mode UE tracking and paging, bearer activation and deactivation, and SGW selection for the UEs 115. The MME may additionally authenticate the UEs 115 and implement Non-Access Stratum (NAS) signaling with the UEs 115

All user IP packets may be transferred through the Serving Gateways, which may be connected to the PDN-GW/ePDG nodes 245. The SGW may reside in the user plane and act as a mobility anchor for inter-eNB handovers and handovers between different access technologies. The PDN-GW/ePDG nodes 245 may provide untrusted non-3GPP access with the EPC 130-a. For example, the PDN-GW/ePDG nodes 245 may provide security mechanisms such as Internet Protocol Security (IPsec) tunneling of connections with the UEs 115 over an untrusted non-3GPP access.

As discussed, the eNBs 105 may access the evolved packet core 130-a directly by communicating with the MME/SGWs 240. The WLAN AP 135 may access the evolved packet core 130-a through the PDN-GW/ePDG 245, which may be configured to secure data transmission with UEs 115-a connected over non-3GPP access. Thus, the PDN-GW/ePDG 245 may act as a termination node of IPsec tunnels associated with the UE 115.

UE 115-a may be a multi-mode UE capable of concurrent communications with eNB 105-a over link 125-a and WLAN AP 135-a over link 125-b. In some embodiments, scheduling of communications over the links 125-a, 125-b may be coordinated by a central scheduler. This coordinated scheduling may be based at least in part on the state (e.g., congestion, rate, modulation type, coding scheme, channel quality, transmit power, scheduling, etc.) of the LTE wireless link 125-a in comparison to the state of the WLAN wireless link 125-b. For example, based on the state of the LTE wireless link 125-a, the transmission of packets related to one or more LTE bearers may be scheduled over the WLAN wireless link 125-b to increase the speed or efficiency of downlink communications between the PDN 250 or EPC 130-a and the UE 115-a.

Figure 3:
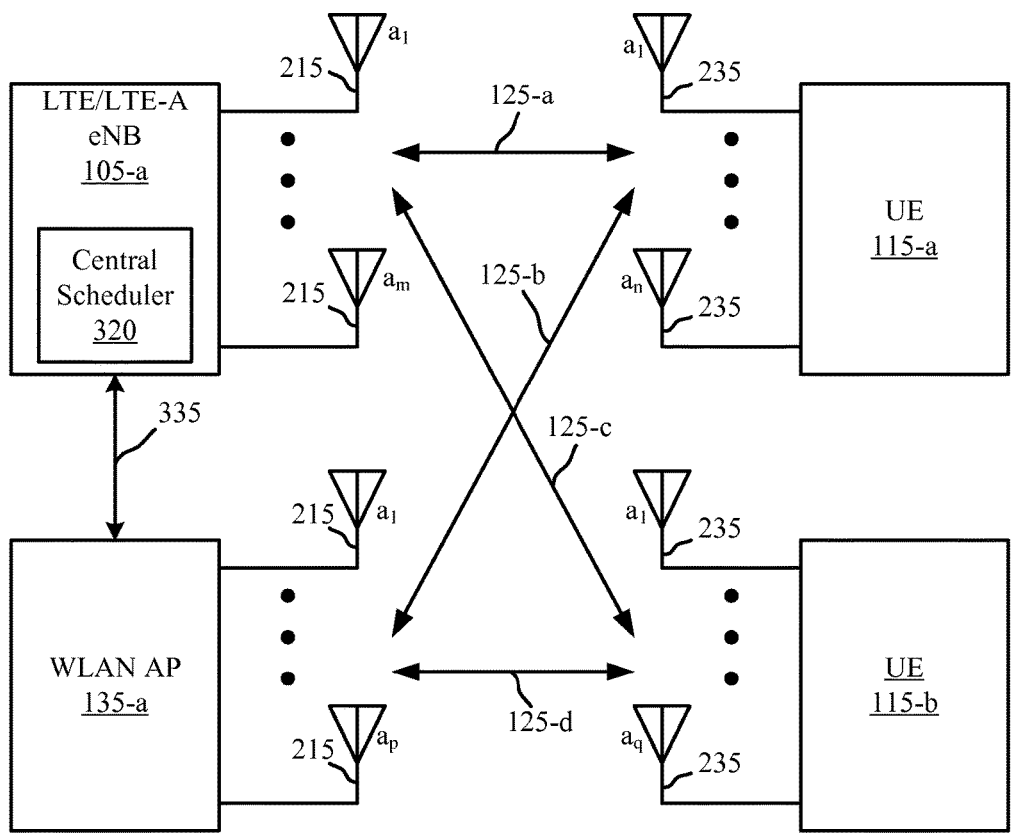
FIG. 3 shows a diagram of an example of a wireless communications system

FIG. 3 is a diagram 300 illustrating aspects of systems 100 and/or 200 in more detail. Diagram 300 illustrates the communication links between LTE eNB 105-a and WLAN AP 135-a and UEs 115. The LTE eNB 105-a and WLAN AP 135-a may be able to communicate data and configuration information with each other, either directly or indirectly, over a backhaul link 335. The system may include a central scheduler 320 which may be a component of one of the access points 105, 135 or a separate component, in some cases.

As illustrated in diagram 300, The LTE eNB 105-a and the WLAN AP 135-a may each have more than one transmit antenna 215 for employing diversity techniques such as transmit diversity, where multiple antennas (or antenna ports) transmit versions of a signal (e.g., delayed, coded, etc.) which maybe equalized at the receiver to provide diversity gain. UEs 115 may also employ receive diversity where signals from multiple antennas are combined to provide diversity gain. The LTE eNB 105-a and the WLAN AP 135-a may employ MIMO techniques to increase diversity gain, array gain (e.g., beamforming, etc.), and/or spatial multiplexing gain.

Each of the UEs 115 may have multiple antennas and may be capable of receiving transmissions over multiple links 125 concurrently, with each link 125 received by separate, non-overlapping subsets of the antennas. For example, UE 115-a may have four antennas $a_1$-$a_4$ and may use a first subset including one, two, or three antennas for receiving link 125-a from LTE eNB 105-a, and a second subset including the antennas not in the first subset for receiving link 125-b from WLAN AP 135-a. Based on the channel conditions between the access points and the UE 115-a, various subsets of the antennas may provide different communication rates between the access points 105, 135 and the UE 115-a. The UEs 115 may report the supported communication rates (e.g., channel quality information (CQI), etc.) for the selected antenna subsets for each link 125.

The systems 100, 200, and 300 may be configured for optimizing multiflow performance and priority across UEs and networks. Multiflow management may include receive antenna selection at the UEs 115, CSI measurement and reporting, and scheduling for multiflow operation. The techniques may evaluate channel conditions for a UE for multiple access points and different combinations of antennas and determine how the UE should feedback CSI for transmissions from the multiple access points. The disclosed techniques also include techniques for scheduling transmissions from the multiple access points using the CSI information to optimize multiflow performance and priority across UEs and networks.

The central scheduler 320 may perform prioritization and scheduling for transmissions from the LTE eNB 105-a and from the WLAN AP 135-a to UE 115-a. The central scheduler 320 may perform prioritization at the bearer level or the UE logical channel level. For example, the central scheduler 320 may form a prioritized list of UE logical channels of the UEs to be scheduled for each scheduling interval. Prioritized lists may include an ordering based on the UEs to be scheduled and a quality of service (QoS) associated with the respective UE logical channels. The central scheduler 320 may use a variety of options for prioritizing UE logical channels for multiple UEs across multiple access points based on CSI feedback from the UEs.

In a first scheduling mode, the central scheduler 320 may determine separate priorities for the first and second links based on a maximum sum capacity of the LTE and WLAN links. In a second scheduling mode, the central scheduler 320 may maintain a single priority list across both the LTE eNB 105-a and WLAN AP 135-a based on the maximum sum capacity of the LTE and WLAN links and may perform wideband scheduling across the access points. In a third scheduling mode, the central scheduler 320 may use orthogonal scheduling between the LTE eNB 105-a and WLAN AP 135-a. In a fourth scheduling mode, the central scheduler 320 maintains individual priority lists for the LTE and WLAN networks and schedules UEs based on optimizing multiflow performance taking into account the supported communication rates for each of three receive configurations for each UE: using the LTE link only, using the WLAN link only, or using both WLAN and LTE links concurrently.

While the description focuses on antenna selection for multiflow operation where a UE 115 is connected to an LTE eNB and a WLAN AP concurrently, the described techniques can be applied to other multiple connection scenarios. For example, the described techniques can be applied to antenna selection and scheduling in carrier aggregation on the same network. In carrier aggregation, the UE may support receiving a downlink carrier from a serving eNB and one or more downlink carriers from one or more non-serving eNBs. The described techniques can be used to perform antenna selection and scheduling for receiving the downlink carriers from the serving and non-serving eNBs.

Figure 4:
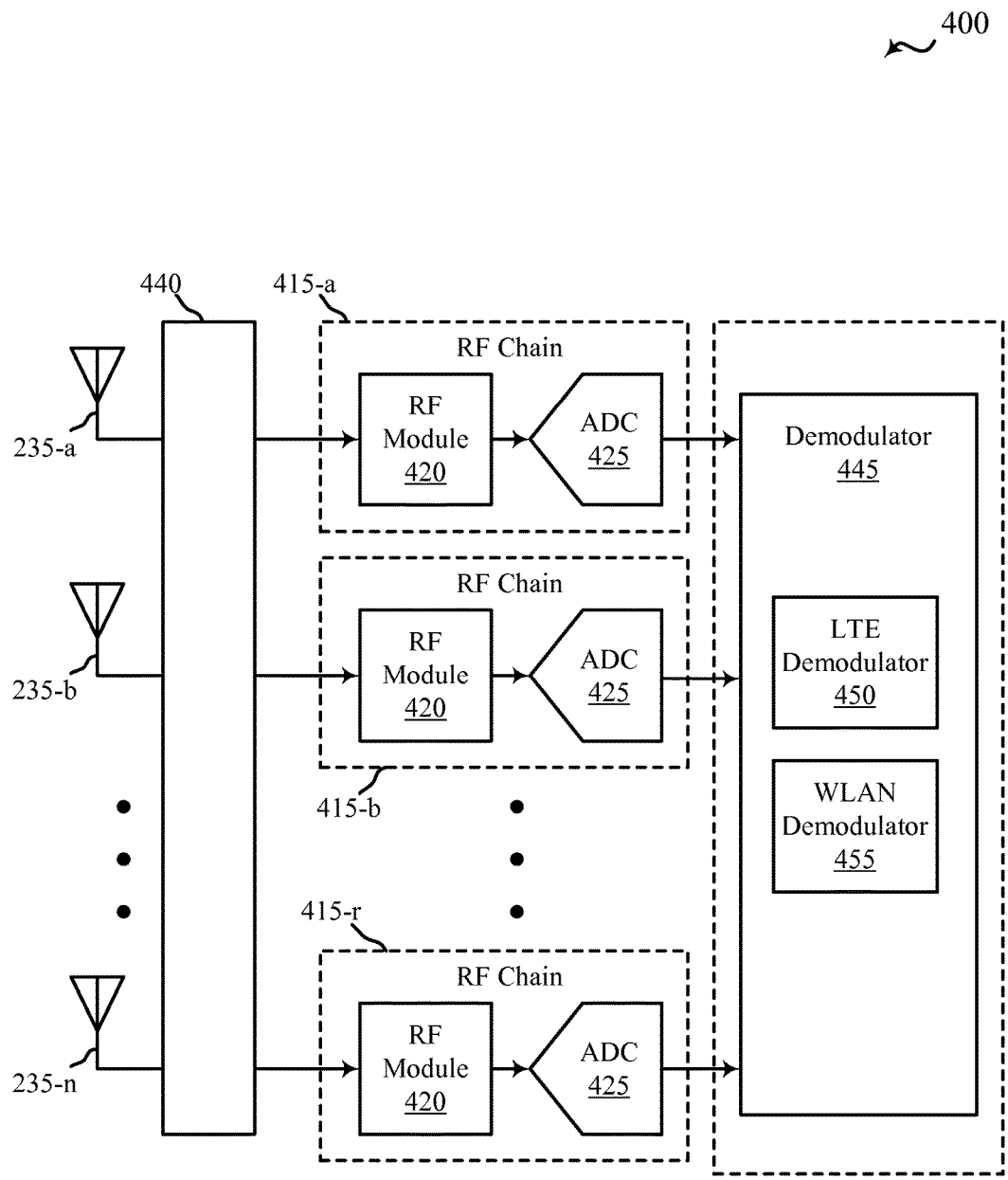
FIG. 4 shows a diagram of a multiple antenna receiver.

FIG. 4 is a diagram of a multiple antenna receiver 400. The receiver 400 may illustrate aspects of the UEs 115 of FIG. 1, FIG. 2, or FIG. 3. The receiver 400 may include N receive antennas 235. The receiver 400 may include R radio frequency (RF) chains 415, where R may generally be less than or equal to N. Each RF chain 415 may include an RF module 420 and an analog-to-digital converter (ADC) 425. Receiver 400 may include switch matrix 440 for connecting antennas 235 and RF chains 415. In embodiments, switch matrix 440 can connect each of the R receive chains 415 to any of the antennas 235. In some examples, R may equal N and switch matrix 440 may be omitted. In this case, each antenna 235 may be directly coupled with an RF chain 415. As used herein, "antenna" may refer to an antenna 235 or an antenna 235 and an associated RF chain 415, depending on context.

During operation, signals received by a receive antenna 235 are provided to an input of the switch matrix 440, which provides those signals to an input of an RF chain 415. At the RF chain, the signals are processed (e.g., amplified, downconverted, filtered, etc.) by the RF module 420 and digitized by the ADC 425. The output of the RF chain 415 is provided to the demodulator 445 for further processing. The demodulator 445 may include modules for concurrently demodulating signals from multiple access points using the same or different RATs (e.g., different frequency bands, modulation techniques, etc.). For example, demodulator 445 may include an LTE demodulator 450 and a WLAN demodulator 455. Each of the demodulators 450, 455 may combine signals received from multiple antennas using receive diversity techniques to increase the signal-to-noise ratio (SNR) or signal-to-interference plus noise ratio (SINR) of the received signals. For example, demodulators 450, 455 may use a suitable signal combining technique such as equal gain combining, maximum ratio combining (MRC), and the like. The demodulators 450, 455 and RF chains 415 may use interference cancellation techniques to further provide interference cancellation and/or suppression (e.g., interference rejection combining, successive interference cancellation, and the like).

In some instances, each antenna may be configured to process signals for a single RAT (e.g., frequency band, etc.) at a time. Different antennas of the receiver 400 may experience different channel conditions or multipath propagation. Thus, when receiver 400 is receiving a transmission associated with one RAT, the receiver 400 may select a subset of antennas for receiving the transmission that includes up to all of the antennas. However, when receiver is receiving multiple concurrent transmissions from multiple access points, the receiver 400 uses disjoint subsets of antennas for each transmission. For example, receiver 400 may select a first subset of the antennas to receive signals associated with one access point (or set of access points associated with a single RAT) and a second, non-overlapping subset of the antennas to receive signals associated with the other access point(s).

Generally, the antenna selection process may be performed dynamically, semi-statically, or when parameter inputs to functions used in antenna selection change. For example, antenna selection may be performed on a timescale of several frames (e.g., several tens of milliseconds) for transmissions to be received during subsequent frames and may be updated based on changes to transmission parameters, channel state information, etc. The receiver may report a quantized capacity (e.g., channel quality information (CQI), etc.) based on the selected antenna subset. For example, the receiver 400 may determine an antenna subset for downlink transmissions and may report supported channel rates to a serving eNB 105 or WLAN AP 135 based on the calculated receiver SNR using the selected antenna subset.

Figure 5:
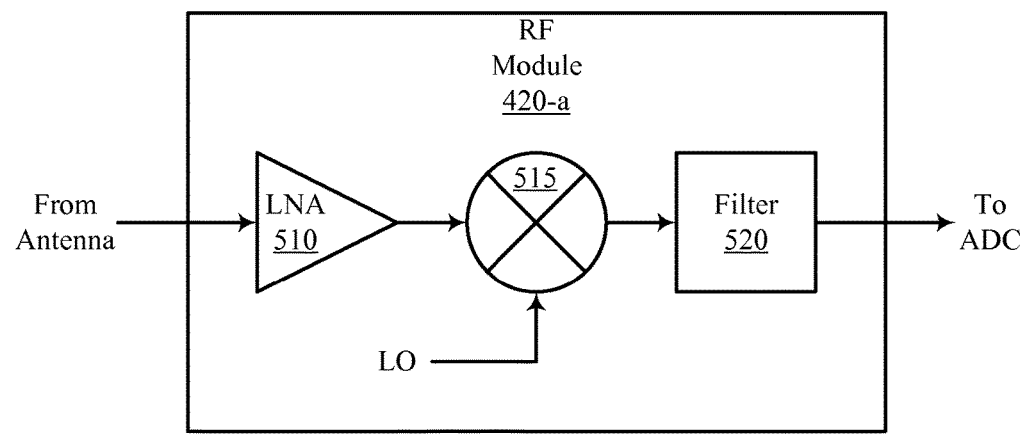
FIG. 5 shows an RF module that may be an example of the RF modules of FIG. 4.

FIG. 5 illustrates an RF module 420-a that may be an example of the RF modules 420 of FIG. 4. In the example shown, the RF module 420-a includes a low-noise amplifier (LNA) 510, a mixer 515, and a filter 520. Each of these components may be in communication, directly or indirectly.

The LNA 510 may amplify low-level signals received from an antenna through a switch (e.g., switch matrix 440). The mixer 515 may be used to downconvert the amplified signals from radio frequency to baseband based on the frequency of a local oscillator (LO) signal. The filter 520 may filter (e.g., bandpass filter) the downconverted signals and may provide the filtered signals to an ADC for digitization. In some embodiments, the RF module 420-a may include additional components such as amplifiers, filters, and/or mixers. For example, the RF module 420-a may include multiple mixers when the downconversion operation involves more than one stage and each of those mixers may be associated with a different LO signal. The RF module 420-a may also include components for interference cancellation or suppression.

Figure 6:
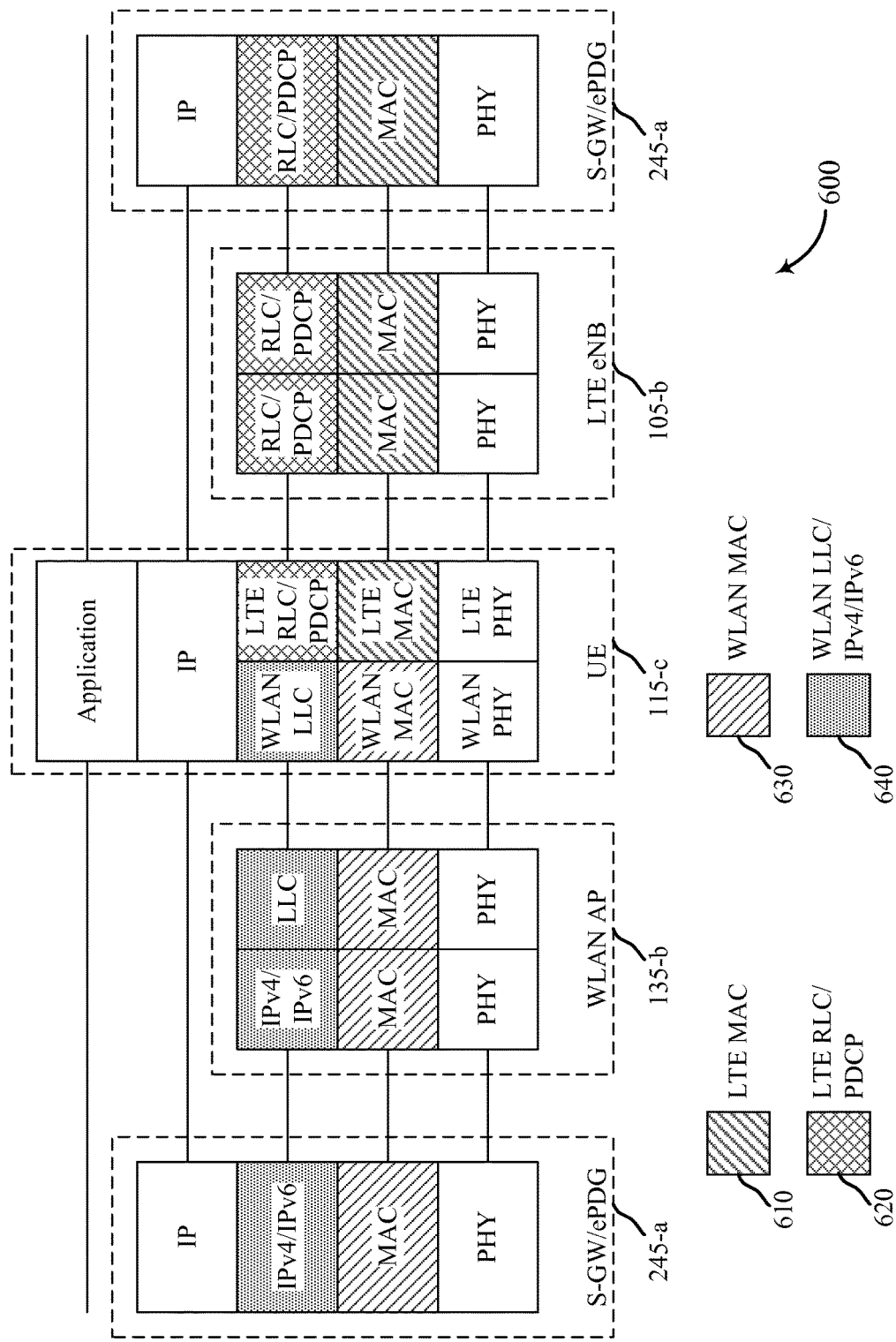
FIG. 6 shows a diagram of a protocol stack for multiflow operation with multiple access points.

FIG. 6 is a diagram 600 of a protocol stack for a UE 115-c in multiflow operation with multiple access points. In some embodiments, the multiple access points may be associated with different RATs and the UE 115-c may be capable of maintaining multiple concurrent connections with multiple access points using different RATs. For example, the UE 115-c may be capable of maintaining concurrent connections with an LTE eNB 105-b and a WLAN AP 135-b. The UE 115-c may implement multiple RAT-specific protocol stacks. For example, the UE 115-c may have an LTE-specific PHY layer, LTE-specific MAC layer 610, and LTE-specific RLC/PDCP layer 620. The UE 115-c may also have a WLAN-specific PHY layer, a WLAN specific MAC layer 630, and a WLAN specific logical link control (LLC) layer or IPv4/IPv6 layer 640.

Figure 7:
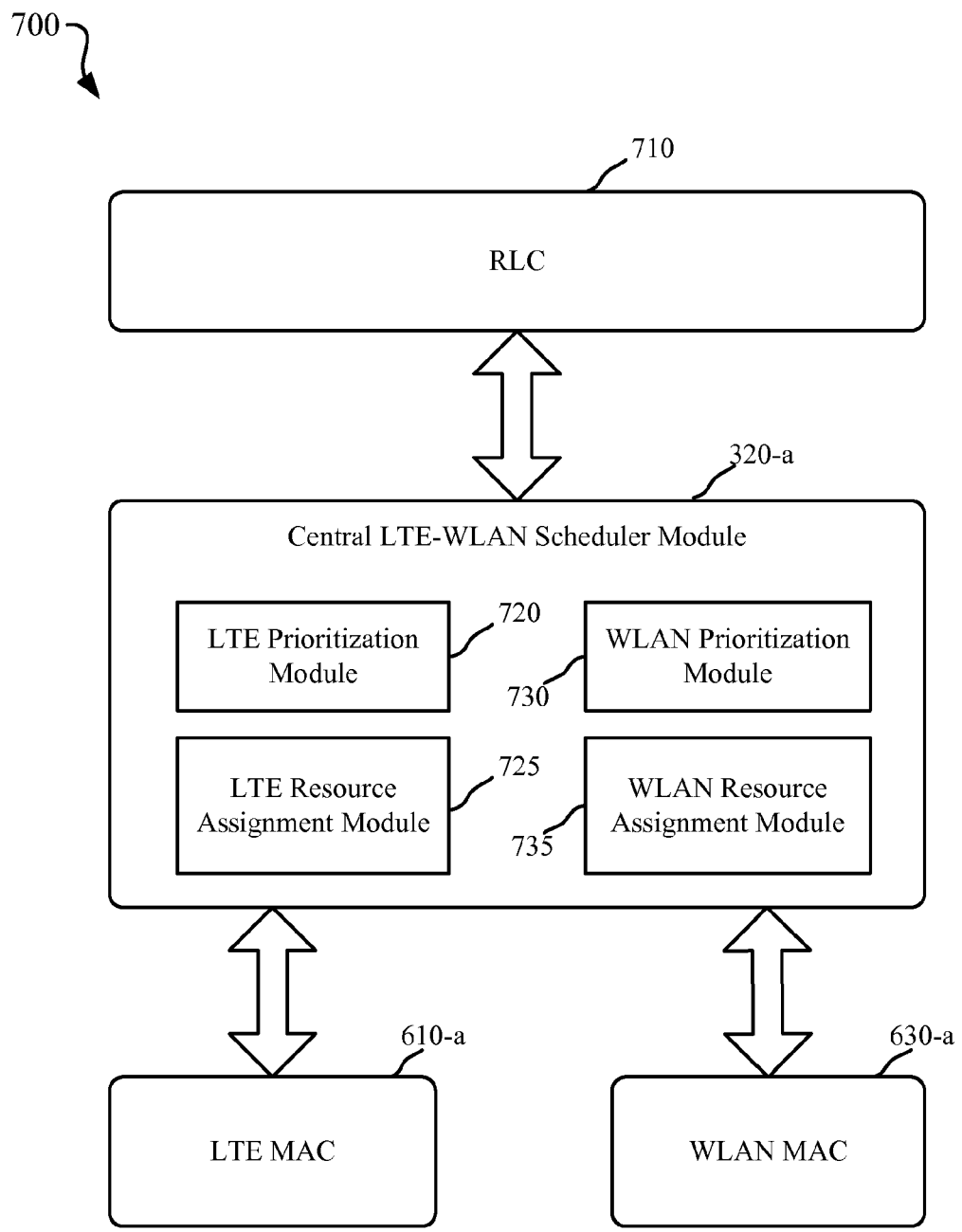
FIG. 7 shows a block diagram of the interactions between network layers and a central scheduler module, as implemented by a system supporting multiflow operation.

FIG. 7 is a block diagram 700 of the interactions between network layers and the central scheduler module 320-a, as implemented by a system supporting multiflow operation. Central scheduler module 320-a may interact between a radio link control (RLC) layer 710, the LTE MAC layer 610-a, and the WLAN MAC layer 630-a. Block diagram 700 may be implemented, for example, by the systems 100, 200, or 300 of FIG. 1, FIG. 2, or FIG. 3 implementing the protocol stack of FIG. 6.

In the present example, a single RLC layer 710 feeds protocol data units (PDUs) or packets from upper network and application layers of a protocol stack to both the LTE MAC layer 610-a and the WLAN MAC layer 630-a in support of multiflow operation. The central scheduler module 320-a may interface with the RLC layer 710 to manage the flow of data between the RLC layer 710 and the LTE and WLAN MAC layers. The LTE and WLAN MAC layers may transfer data over the communication links (e.g. PHY layer, etc.) via an LTE eNB 105 and WLAN AP 135. For example, the central scheduler 320-a may manage communications for UE 115-c using the protocol stack illustrated in FIG. 6.

The central scheduler 320-a may request and receive queue size reports from the RLC layer 710. The queue size reports may indicate an amount of downlink data ready to be transmitted from the RLC layer 710 to one or more logical channels of the UE.

At each of a number of scheduling instances for the LTE and/or WLAN wireless links, some of which may coincide, the central scheduler 320-a may form separate priority lists for LTE and WLAN. According to an order defined by the lists, the central scheduler 320-a may assign LTE resources and tentatively determine an amount of data to place into a WLAN transmit buffer for each logical channel of the UE. The central scheduler 320-a may determine whether to use LTE or WLAN to transmit data for each of the LTE logical channels according to a prioritization between LTE and WLAN based at least in part on the state of the LTE network.

An LTE prioritization module 720 of the central scheduler 320-a may determine a priority list of LTE logical channels of the UEs according to an LTE-specific proportional fairness calculation. Similarly, a WLAN prioritization module 730 may determine a priority list of the logical channels of the UEs according to a WLAN-specific proportional fairness calculation. One or more of these determined priorities may be based at least in part on channel quality reports (e.g., CQI, etc.) received from the LTE MAC layer 610-a, and channel quality and buffer status reports received from the WLAN MAC layer 630-a. A LTE resource assignment module 725 and a WLAN resource assignment module 735 of the central scheduler 320-a may select and assign LTE and WLAN resources for different portions of downlink data to be transmitted over the logical channels of the UE.

Scheduling intervals for LTE downlink transmissions may occur periodically (e.g., every 1 millisecond), while scheduling intervals for WLAN downlink transmissions may occur periodically and/or aperiodically. It may be desirable for the LTE downlink scheduling intervals and the WLAN downlink scheduling intervals to overlap, at least some of the time, as joint processing may be enabled.

In some embodiments, RLC layer 710 may be the LTE RLC layer 620 of FIG. 6 and multiflow may be used off-load LTE logical channel data to the WLAN link. At each of a number of periodic WLAN downlink scheduling intervals, the central scheduler 320-a may determine, for each of a plurality of logical channels and UEs, whether any data from that logical channel and that UE is to be pushed to the corresponding transmit buffer(s) of the WLAN MAC layer 630-a.

Prioritization among users may be performed based on a proportional fair share algorithm per RAT. A priority metric PM may be computed for each scheduling interval (e.g., LTE subframe, etc.). In certain examples, the priority metric PM for a given UE i, LTE logical channel j, and a RAT (i.e., LTE or WLAN) may be computed as follows:

$$PM_i^j = \frac{R_{max,i}}{\max(R_{avg,i}^j, \rho) \cdot \left(1 - \frac{\min(D_i^j, D_{max,i}^j - \varepsilon)}{D_{max,i}^j}\right)^\delta}$$

Where:
$R_{max,i}$ is a requested data rate for that RAT based on the supportable modulation and coding scheme (MCS), as determined by reported channel rate of that RAT for UE i, $R_{avg,i}^j$ is an average rate of data served to UE i for LTE logical channel j over both RATs, $D_{max,i}^j$ is a delay deadline associated with the Quality of Service (QoS) requirements of LTE logical channel j at UE $D_i^j$ is a current head of line delay deadline, $\delta$ is a scheduling metric exponent, and $\varepsilon$ and $\rho$ are small numbers to prevent division by zero.

The average rate may be calculated as the sum of the average rates observed across both links to consider the composite fairness. For example, the average rate may be computed as follows:

$$R_{avg,i}^j(t) = R_{LTEavg,i}^j(t) + R_{WLANavg,i}^j(t)$$

Where:
$R_{LTEavg,i}^j(t)$ is the filtered rate on LTE, calculated without changes to the current implementation $R_{WLANavg,i}^j(t)$ is the data rate averaged over the data successfully transmitted on the WLAN link within a specified time window.

A single joint priority list may be used for resource assignment, formed by joining the LTE and WLAN priority lists and ordering the entries in descending order.

Figure 8:
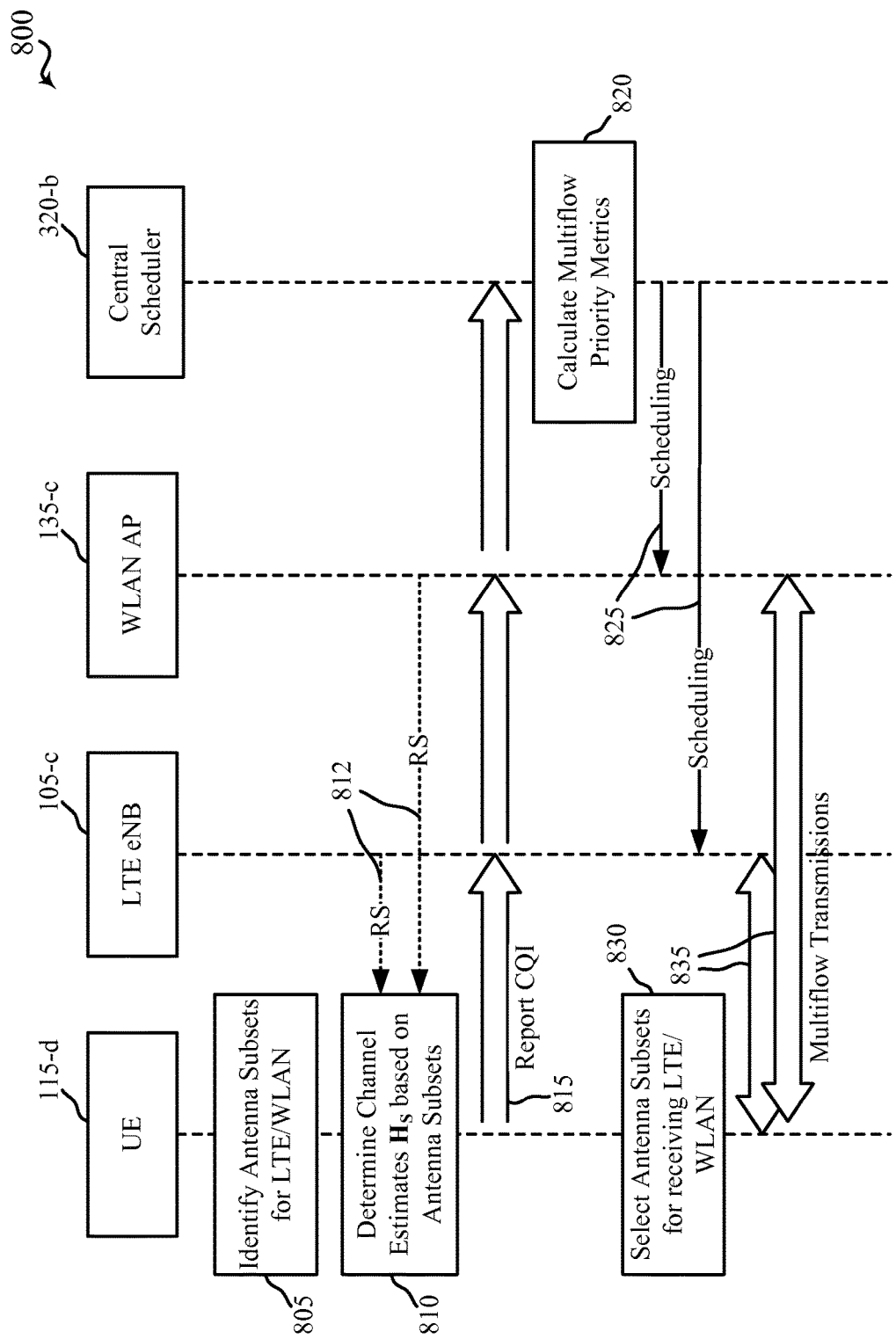
FIG. 8 shows a message flow diagram for scheduling prioritization in multiflow with antenna selection.

FIG. 8 illustrates a message flow diagram 800 for scheduling prioritization in multiflow with antenna selection. Message flow diagram 800 may illustrate, for example, multiflow operation for a UE 115-d with concurrent connections to an LTE eNB 105-c and a WLAN AP 135-c.

At block 805, UE 115-d may identify antenna subsets available for communication with the LTE and WLAN access points. In the case of a UE with four antennas, $a_1$-$a_4$, the set of possible subsets K is provided by Table 1.

TABLE 1

| Antenna Subset | Antennas |
| --- | --- |
| $k_1$ | $a_1$ |
| $k_2$ | $a_2$ |
| $k_3$ | $a_3$ |
| $k_4$ | $a_4$ |
| $k_5$ | $a_1$, $a_2$ |
| $k_6$ | $a_1$, $a_3$ |
| $k_7$ | $a_1$, $a_4$ |
| $k_8$ | $a_2$, $a_3$ |
| $k_9$ | $a_2$, $a_4$ |
| $k_{10}$ | $a_3$, $a_4$ |
| $k_{11}$ | $a_1$, $a_2$, $a_3$ |
| $k_{12}$ | $a_1$, $a_2$, $a_4$ |
| $k_{13}$ | $a_1$, $a_3$, $a_4$ |
| $k_{14}$ | $a_2$, $a_3$, $a_4$ |
| $k_{15}$ | $a_1$, $a_2$, $a_3$, $a_4$ |

For example, UE 115-d may identify a set of antenna subsets that may be used to receive transmissions over the LTE link and a set of antenna subsets that may be used to receive transmissions over the WLAN link. The available sets of antenna subsets may be identified based on restrictions associated with the links. For example, a link may have a restriction of using at least two receive antennas. In the case of a UE with four antennas, $a_1$-$a_4$, the set of available subsets K' satisfying this restriction would be K'={$k_5$, $k_6$, $k_7$, $k_8$, $k_9$, $k_{10}$, $k_{11}$, $k_{12}$, $k_{13}$, $k_{14}$, $k_{15}$}.

At block 810, the UE 115-d determines channel estimates $H_S$ for the links based on the available antenna subsets for each link. The UE 115-d may determine the channel estimates based on pilot signals or reference signals (RS) 812 transmitted by the LTE eNB 105-c and WLAN access point 135-c. For example, the UE 115-d may determine a measurement window in which to receive the reference signals of a link using all antennas and use the received signals to determine channel estimates of each available antenna subset.

At block 815, the UE 115-*d* reports channel rates (e.g., CQI, etc.) for the links to either or both of the LTE eNB 105-*c* and the WLAN access point 135-*c*. The UE 115-*d* may report channel rates for each link using the best antenna subset for each link. For example, for a UE having N receive antennas, a rate $R_{LTE}^N$ may be determined that is the maximum supported rate for the LTE link using any combination of the N antennas up to and including all N receive antennas. Similarly, a rate $R_{WLAN}^N$ may be determined that is the maximum supported rate for the WLAN link using any combination of the N antennas up to and including all N receive antennas.

Additionally or alternatively, the UE 115-*d* may report channel rates based on the maximum sum capacity of the links using non-overlapping antenna subsets. For example, the UE 115-*d* may determine the maximum sum capacity of the LTE and WLAN links using a set of non-overlapping antenna hypotheses.

FIG. 9 illustrates a table 900 of example antenna configurations for concurrently receiving multiple links. Specifically, Table 900 illustrates a set X 905 of non-overlapping antenna configurations with at least one antenna for each RAT (LTE and WLAN) for a UE 115 having four receive antennas according to the antenna subsets given in Table 1. However, non-overlapping antenna selection configurations may be generated for UEs 115 having any number of receive antennas in a similar manner. The set of antenna configurations to be evaluated may be based on various restrictions for the links. For example, the set Y 910 of antenna configurations illustrates a set of antenna configurations, with at least one antenna for each RAT (LTE and WLAN), satisfying the restriction that the LTE link be received with at least two antennas.

The UE 115-*d* may calculate the sum capacity of the LTE and WLAN links for each antenna selection hypothesis of a set of antenna configurations (e.g., set X 905, set Y 915, etc.) based on the channel estimates of each link using the associated antenna subset of the hypothesis. The UE 115-*d* may report channel rates for each link based on the antenna selection hypothesis having the maximum sum capacity of the antenna selection hypotheses. For example, the UE 115-*d* may determine that the maximum sum capacity of the LTE and WLAN links corresponds to using the antenna subset r to receive the LTE link and using the antenna subset N-r to receive the WLAN link, where the antenna subsets r and N-r are non-overlapping subsets (i.e., r∩N−r={ }). In this case, the UE 115-*d* may report a rate $R_{LTE}^r$ for the LTE link and a rate $R_{WLAN}^{N-r}$ for the WLAN link.

Returning to FIG. 8, the UE 115-*d* may report CQI at block 815 based on an antenna selection period. For example, an antenna selection period may be determined and may be synchronous with a CQI reporting interval (e.g., an integer number of CQI reporting intervals, etc.). The UE 115-*d* may measure channel estimates $H_S$ at block 810 and report CQI at block 815 based on the antenna selection period.

The central scheduler 320-*b* may perform prioritization and scheduling for transmissions from the LTE eNB 105-*c* and the WLAN access point 135-*c* to UEs 115 connected to one or both access points at block 820. The central scheduler 320-*b* may perform prioritization at the bearer level or the UE logical channel level. For example, the central scheduler 320-*b* may form a prioritized list of UE logical channels of the UEs to be scheduled for each scheduling interval.

Prioritized lists may include an ordering based on the UEs to be scheduled and a quality of service (QoS) associated with the respective UE logical channels. The central scheduler 320-*b* may use a variety of options for prioritizing UE logical channels for multiple UEs across multiple access points based on CSI feedback from the UEs.

In a first scheduling mode, the central scheduler 320 may determine separate priorities for the first and second links based on the reported communication rates. For example, the central scheduler 320 may determine a priority metric for each UE for each of the LTE and WLAN networks.

For the first mode, the UE 115-*d* may report supported communication rates for the LTE and WLAN links based on antenna selection that provides a maximum sum capacity of the links. For example, the UE 115-*d* may report a rate $R_{LTE}^r$ for the LTE link and a rate $R_{WLAN}^{N-r}$ for the WLAN link. The UE may take into account the loading of the LTE and WLAN networks when determining the maximum sum capacity. For example, the UE 115-*d* may weight the calculated capacity for each link based on the estimated use of the link (e.g., based on recent scheduling on the links, etc.).

In the first mode, the scheduler may maintain separate priority lists for LTE and WLAN links. The LTE/WLAN priority may be based on the rate $$PM_i^j = \frac{R_{maxh,i}}{\max(R_{avg,i}^j, \rho) \cdot \left(1 - \frac{\min(D_i^j, D_{max,i}^j - \varepsilon)}{D_{max,i}^j}\right)^\delta}$$

Where:
$R_{maxh,i}$ is the requested data rate based on the supportable MCS per RAT for UE i with antenna selection hypothesis h which yields the maximum sum capacity over both LTE and WLAN links (e.g., $R_{LTE}^r$, $R_{WLAN}^{N-r}$, etc.).

In a second scheduling mode, the central scheduler 320-*b* may maintain a single priority list across both LTE and WLAN access points and may perform wideband scheduling across the access points. For the second scheduling mode, the UE 115-*d* also reports supported communication rates for each access point based on non-overlapping subsets of antennas that provide the maximum sum capacity of the LTE and WLAN links. The central scheduler 320-*b* may maintain a single priority list and schedule the top priority UE first for both access points using wideband scheduling.

In a third scheduling mode, the central scheduler 320-*b* may use orthogonal scheduling between the LTE and WLAN access points. For example, the central scheduler 320-*b* may maintain independent priority metrics for each access point and may ensure that UEs scheduled for communication using the LTE communication link are not simultaneously scheduled on the WLAN communication link.

For the third mode, the UE 115 may report supported communication rates based on the antenna subsets for each link that provide the best capacity for that link. For example, the UE can report $R_{LTE}^N$ for the LTE link and $R_{WLAN}^N$ for the WLAN link. For the third mode, the first and second antenna subsets can be overlapping because of the orthogonal scheduling.

In a fourth scheduling mode, the scheduler maintains individual priority lists for the first and second access points and schedules UEs based on optimizing multiflow performance taking into account the supported communication rates for each of three receive configurations for each UE:

using the LTE communication link only, using the WLAN communication link only, or using both LTE and WLAN links at the same time. In other words, UEs may report dual CQI for one or both of the LTE and WLAN links. For the LTE link, the UE may report a first set of LTE CQI generated under the assumption that it uses the LTE link only as well as a second set of LTE CQI generated under the assumption that LTE and WLAN links are used at the same time. The first set of CQI can be generated based on receive configurations that use up to all receive antennas for the LTE link (e.g., $R_{LTE}^N$). The second set of CQI can be based on the maximum sum capacity of both links when used at the same time (e.g., $R_{LTE}^r$). Similarly, the UE may report dual CQI for the WLAN link. For example, the UE may report a first set of WLAN CQI based on using the WLAN link only (e.g., $R_{WLAN}^N$) and a second set of WLAN CQI based on the maximum sum capacity of both links when used at the same time (e.g., $R_{WLAN}^{N-r}$). The second sets of LTE and WLAN CQI may be calculated by weighting the load of each individual link. With dual CQI feedback, each possible receive configuration for the UEs may be ranked by the sum of priority across multiple access points. The central scheduler 320-b may determine priority metrics to maximize instantaneous capacity of the networks with normalized throughput.

For the fourth mode, the UE may report supported communication rates for each receive configuration. For example, in a system with two UEs ($UE_1$ and $UE_2$), each having N antennas:

$UE_1$ may report $\{(R_{LTE,1}^N, R_{WLAN,1}^N), (R_{LTE,1}^{r_1}, R_{WLAN,1}^{N-r_1})\}$ $UE_2$ may report $\{(R_{LTE,1}^N, R_{WLAN,2}^N), (R_{LTE,2}^{r_2}, R_{WLAN,1}^{N-r_2})\}$ The valid hypotheses for determining UE priority are:
$h_0=(R_{LTE,1}^N, R_{WLAN,2}^N)$
$h_1=(R_{LTE,2}^N, R_{WLAN,1}^N)$
$h_2=(R_{LTE,1}^{r_1}, R_{WLAN,1}^{N-r_1})$
$h_3=(R_{LTE,2}^{r_2}, R_{WLAN,2}^{N-r_2})$ The priority metric may be computed for each hypothesis per RAT and summed over LTE and WLAN. Thus, the priority metric based on full feedback (e.g., CQI for each receive configuration) may maximize instantaneous capacity with normalized throughput.

In some instances, certain hypotheses may be exclusive of other hypotheses. For example, $h_0$ and $h_1$ may be exclusive of other hypotheses. In addition, a UE may be able to take up the entire channel bandwidth for a RAT (e.g., full buffer, etc.) in some cases. For these cases, scheduling needs only to pick the best hypothesis.

For traffic models more generally, a single UE may not be able to occupy the entire bandwidth of a RAT. For example, if $h_2$ is ranked as the highest priority hypothesis, the scheduler can proceed to $h_3$ for remaining resources after scheduling $UE_1$ (and vice-versa if $h_3$ is ranked highest). The central scheduler may compare the sum priority of both $h_2$ and $h_3$ compared to $h_0$ or $h_1$ when selecting a hypothesis for scheduling.

The scheduler may schedule the UE for transmissions using either or both communication links within a transmission interval and may indicate a receive configuration or other parameter used by the UE in determining antenna subsets for receiving the scheduled transmissions. For example, the scheduler may determine an antenna subset, a number of antennas, or the receive configuration and may send the parameters using control information (e.g., downlink grants) or an RRC configuration message. In some examples, the scheduler may indicate over the first link whether the UE will receive transmissions over the second link during a particular transmission interval.

Figure 10:
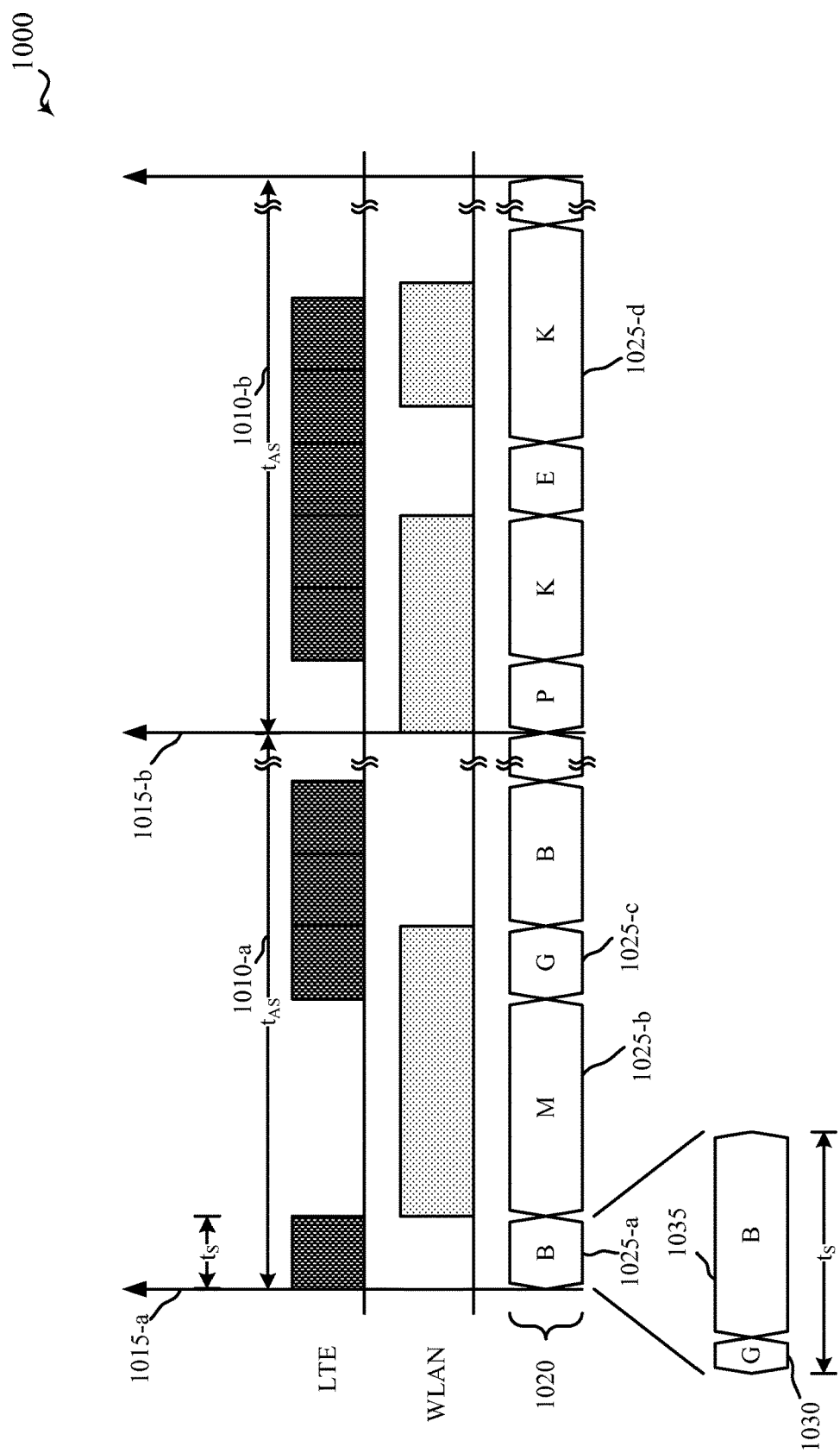
FIG. 10 shows a timing diagram of antenna selection for a UE in a system employing centralized scheduling using full channel rate feedback.

FIG. 10 illustrates a timing diagram 1000 of antenna selection for a UE 115 using the fourth scheduling mode. Timing diagram 1000 illustrates two antenna selection periods 1010, which may be determined by the CQI reporting intervals and other factors. In the example illustrated in FIG. 10, the UE 115 has four antennas ($a_1$-$a_4$) and antenna selection 1020 is used to select an antenna configuration A-P as shown in FIG. 9 for receiving downlink transmissions from either the LTE eNB 105 or WLAN AP 135, or from both networks concurrently with non-overlapping antenna subsets.

At the beginning of the first antenna selection period 1010-a, the UE 115 may determine that antenna configuration B provides the highest capacity for receiving an LTE link from an LTE eNB 105, antenna configuration M provides the highest capacity for receiving a WLAN link from a WLAN AP 135, and antenna configuration G provides the maximum sum capacity of the antenna configurations when receiving the LTE and WLAN link concurrently. The UE 115 may report CQI at the beginning of the first antenna selection period 1010-a based on the determined antenna configurations for each receive configuration, as shown by CQI reporting 1015-a. For example, the UE 115 may report channel rates given by ($R_{LTE}^{k_{14}}$, $R_{WLAN}^{k_{12}}$), ($R_{LTE}^{k_9}$, $R_{WLAN}^{k_6}$).

The scheduler may determine that the highest priority scheduling hypothesis for the first transmission interval 1025-a (e.g., subframe, etc.) schedules the UE on LTE only. The scheduler (e.g., via the LTE eNB 105), may indicate the scheduling decision for the subframe 1025-a. For example, a first portion of the subframe may be a control channel (e.g., PDCCH, etc.) 1030 used to provide a downlink grant to the UE 115. When receiving the control channel, the UE 115 may not know whether it will receive transmissions from LTE, WLAN, or both during the subframe. However, the control channel 1030 may be coded and modulated at a lower rate. Thus, the UE 115 may receive the control channel 1030 using the antenna subset for the condition of concurrent reception of LTE and WLAN (e.g., antenna configuration G). Alternatively, the UE 115 may use a default antenna subset for receiving the control channel 1030. The downlink grant (e.g., downlink control information (DCI), etc.) may indicate whether the UE 115 will receive downlink transmissions in the data channel 1035 on LTE. Additionally, the downlink grant may indicate whether the UE 115 will receive downlink transmission from WLAN (e.g., in the subframe or for some number of subframes, etc.). In the timing diagram 1000, the UE receives LTE transmissions and not WLAN transmissions in subframe 1025-a and uses antenna configuration B (e.g., antenna subset $k_{14}$) for receiving the LTE data channel (e.g., PDSCH) of the subframe.

In subframes 1025-b, the UE 115 receives transmissions from only WLAN and thus uses antenna configuration M (e.g., antenna subset $k_{12}$) for receiving WLAN transmissions. Again, because the control channel of the LTE carrier may be coded and modulated at a lower rate than the data channel, the UE 115 may be able to receive the control channel using the remaining antennas not used for WLAN in configuration M (e.g., $a_3$). In subframes 1025-c, the UE 115 may be scheduled for both LTE and WLAN concurrently and may use antenna configuration G.

At the start of the next antenna selection period 1010-b, the UE 115 may again measure channel conditions for the antenna subset hypotheses and may report dual CQI (e.g., maximum rate for each link separately and maximum sum rate) at arrow 1015-*b*. As illustrated by subframes 1025-*d*, the LTE and WLAN networks may not be synchronous and thus time periods where there is some overlap of LTE and WLAN transmissions may be considered to be concurrent reception subframes.

Returning to FIG. 8, the central scheduler 320-*b* may communicate the scheduling information 825 to the LTE eNB 105-*c* and WLAN AP 135-*c*. The central scheduler 320-*b* may also send information to the UE 115-*d* for selecting antenna subsets for receiving multiflow transmissions. For example, the central scheduler 320-*b* may send an antenna receive configuration, an antenna subset index, or an antenna subset size to the UE 115-*d* associated with each link. At block 830, the UE 115-*d* may select antenna subsets for receiving multiflow transmissions 835 from the LTE eNB 105-*c* or WLAN AP 135-*c*, or from both links concurrently.

The central scheduler 320-*b* may determine the scheduling mode based on load, UE capabilities, bearer or UE logical channel QoS, channel conditions, or the occurrence of various events (e.g., handover, cell association, cell disassociation, etc.). For example, joint scheduling may be selected when the access points are not heavily loaded while orthogonal scheduling may be selected when one or both access points are more heavily loaded.

The UE 115-*d* may indicate antenna selection capabilities to the central scheduler 320-*b* for multiflow operation. For example, the UE 115-*d* may indicate whether it can perform antenna selection and/or whether it can receive concurrent transmissions from different access points (e.g., LTE eNB 105-*c* and WLAN AP 135-*c*, etc.) using non-overlapping antenna subsets selected according to channel rates (e.g., maximum sum capacity of the links, etc.). The indication may be sent in a configuration message (e.g., RRC message, etc.).

Multiflow operation may also be performed at the bearer level. For bearer-level multiflow, adaptation of antenna configuration may be slower. For example, the UE may report long-term average CQI with the different antenna hypotheses. The scheduler may determine bearer priority and assign packet flow at the bearer level accordingly. In some embodiments, the LTE eNB 105-*a* may indicate the antenna assignment to the UE (e.g., RRC level or subframe level adaptation).

While the description of FIG. 8, FIG. 9, and FIG. 10 refers to a UE operating in a multiflow environment with LTE and WLAN links, the described antenna selection techniques can also be applied to other communication environments. For example, these techniques may be applied to other communication environments where antenna selection or sharing among links may provide benefits in receiving transmissions. In some examples, these techniques can be applied to multi-carrier or carrier aggregation environments where receive antennas at the UE can be shared among multiple carriers. In this case, each received carrier may be considered to be a communication link and the above techniques may be used for antenna selection and scheduling for the multiple carriers.

Figure 11:
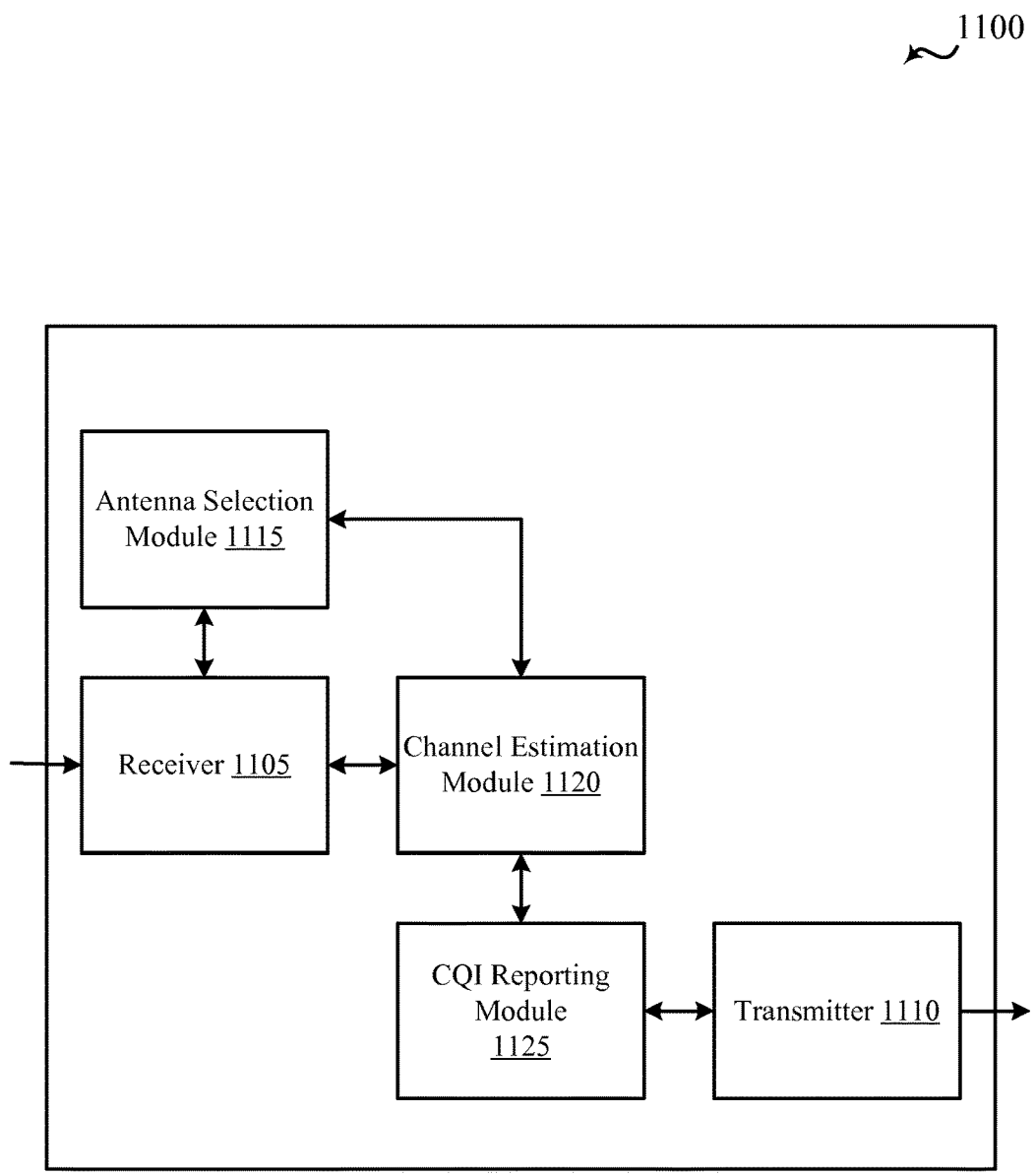
FIG. 11 shows a device for performing antenna selection in multiflow operation.

FIG. 11 illustrates a device 1100 for performing antenna selection in multiflow operation according to various embodiments. Device 1100 may illustrate, for example, aspects of UEs 115 illustrated in FIG. 1, FIG. 2, FIG. 3, FIG. 6, FIG. 8, or FIG. 13, or receiver/demodulator 400 of FIG. 4. Device 1100 includes receiver 1105, transmitter 1110, antenna selection module 1115, channel estimation module 1120, and CQI reporting module 1125. Each of these components may be in communication with each other.

Antenna selection module 1115 may identify sets of antenna subsets for communication with multiple access points in multiflow operation. For example, antenna selection module 1115 may identify a set of antenna subsets that may be used to receive transmissions over an LTE link and a set of antenna subsets that may be used to receive transmissions over a WLAN link. The available sets of antenna subsets may be identified based on restrictions associated with the links. The available sets of antenna subsets may include available subsets for receiving each link independently and both links concurrently.

Channel estimation module 1120 may determine channel estimates for the multiple communication channels for the available subsets. For example, the channel estimation module 1120 may determine a measurement window in which to receive reference or other signals of a link using all antennas and use the received signals to determine channel estimates of the link for each available antenna subset.

CQI reporting module 1125 may report CQI (e.g., via transmitter 1110) to one or more of the access points in multiflow operation with the device 1100. CQI reporting module 1125 may determine the CQI to report based on a scheduling mode. For example, CQI reporting module 1125 may report channel rates for each link using the best antenna subset for each link, channel rates based on the maximum sum capacity of the links using non-overlapping antenna subsets, or both.

The receiver 1105 may receive transmissions from one or more of the multiple access points based on the reported CQI. Antennas of the receiver may be selected by the antenna selection module 1115. Selection of the antenna subsets may be based on the scheduling mode and other information (e.g. downlink grants, etc.).

Figure 12:
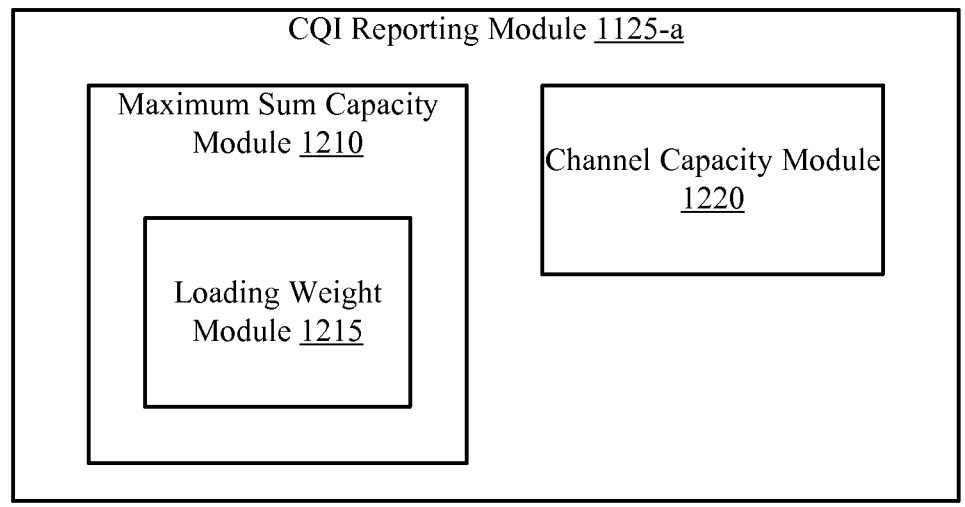
FIG. 12 shows an embodiment of a CQI reporting module for reporting CQI in multiflow operation.

FIG. 12 illustrates an embodiment of a CQI reporting module 1125-*a* for reporting CQI in multiflow operation according to various embodiments. CQI reporting module 1125-*a* may illustrate, for example, aspects of CQI reporting module 1125 of FIG. 11. CQI reporting module 1125-*a* includes maximum sum capacity module 1210 and channel capacity module 1220. Maximum sum capacity module 1210 may include loading weight module 1210. Each of these components may be in communication with each other.

Maximum sum capacity module 1210 may determine the maximum sum capacity of multiple communication links for multiflow operation. For example, maximum sum capacity module 1210 may determine channel capacities for each link for a set of antenna configurations with non-overlapping antenna subsets. Maximum sum capacity module 1210 may determine the antenna configuration having the highest maximum sum capacity. Loading weight module 1210 may take into account the loading of the LTE and WLAN networks when determining the maximum sum capacity. For example, the loading weight module 1210 may weight the calculated capacity for each link based on the estimated use of the link (e.g., based on recent scheduling on the links, etc.).

Channel capacity module 1220 may determine channel capacities of the links independent of other links. For example, channel capacity module 1220 may determine the highest supported rate of each link using any available antenna subset up to and including all receive antennas.

Figure 13:
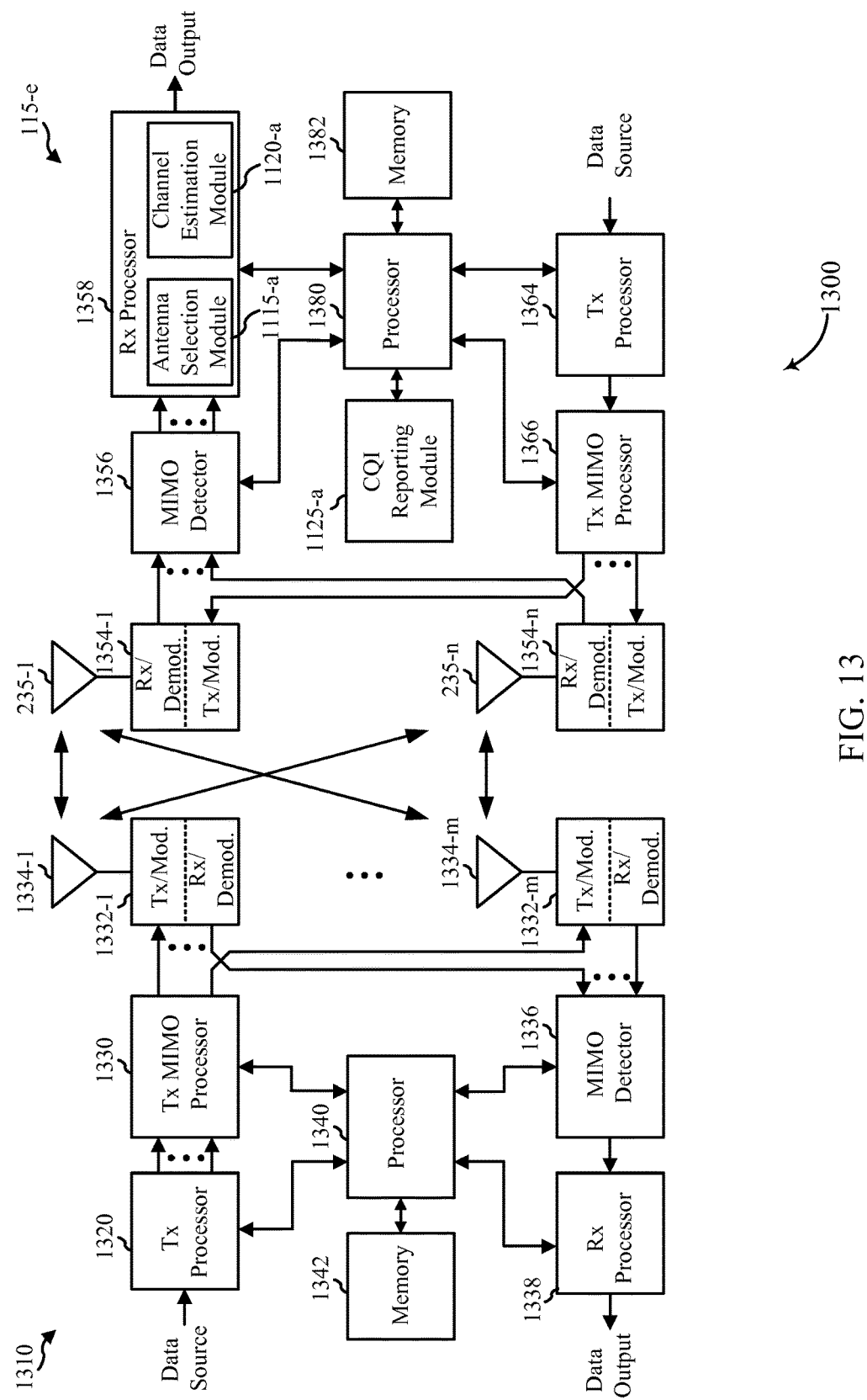
FIG. 13 shows a block diagram of a MIMO communication system including a base station and a mobile device or UE.

FIG. 13 is a block diagram of a MIMO communication system 1300 including a base station 1310 and a mobile device or UE 115-*e*. The base station 1310 may be an example of the access points 105, 135 (e.g., LTE eNB, WLAN AP, etc.) of FIG. 1, FIG. 2, FIG. 3, FIG. 6, FIG. 8, or FIG. 15 while the mobile device 115-e may be an example of the communication devices 115 of FIG. 1, FIG. 2, FIG. 3, FIG. 6, FIG. 8, or FIG. 14. This system 1300 may illustrate aspects of the system 100 of FIG. 1, system 200 of FIG. 2, or system 300 of FIG. 3. Moreover, the system 1300 may illustrate aspects of the multiple-antenna receiver 400 of FIG. 4. The base station 1310 may be equipped with M antennas 1334-1 through 1334-m, and the mobile device 115-e may be equipped with N antennas 235-1 through 235-n. In the system 1300, the base station 1310 may be able to send data over multiple communication links at the same time. Each communication link may be called a "layer" and the "rank" of the communication link may indicate the number of layers used for communication. Each layer may transmit a different data stream. Additionally or alternatively, the base station 1310 may employ transmit diversity to improve robustness of transmissions received by the mobile device 115-e. The mobile device 115-e may employ receive diversity using multiple receive antennas to combine signals received at multiple antennas.

At the base station 1310, a transmit (Tx) processor 1320 may receive data from a data source. The transmit processor 1320 may process the data. The transmit processor 1320 may also generate reference symbols, and a cell-specific reference signal. A transmit (Tx) MIMO processor 1330 may perform spatial processing (e.g., precoding) on data symbols, control symbols, and/or reference symbols, if applicable, and may provide output symbol streams to the transmit modulators 1332-1 through 1332-m. Each modulator 1332 may process a respective output symbol stream (e.g., for OFDM, etc.) to obtain an output sample stream. Each modulator 1332 may further process (e.g., convert to analog, amplify, filter, and upconvert) the output sample stream to obtain a downlink (DL) signal. In one example, DL signals from modulators 1332-1 through 1332-m may be transmitted via the antennas 1334-1 through 1334-m, respectively.

At the mobile device 115-e, the mobile device antennas 235-1 through 235-n may receive the DL signals from the base station 1310 and may provide the received signals to the demodulators 1354-1 through 1354-n, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-1 through 1354-n, perform MIMO detection on the received symbols if applicable, and provide detected symbols. A receive (Rx) processor 1358 may process (e.g., demodulate, deinterleave, and decode) the detected symbols, providing decoded data for the mobile device 115-e to a data output, and provide decoded control information to a processor 1380, or memory 1382.

The mobile device 115-e may employ antenna selection for multiflow operation. For example, antenna selection module 1115-a may identify sets of antenna subsets of the receive antennas 235 for communication with multiple access points in multiflow operation. In embodiments, antenna selection module 1115-a may identify a set of antenna subsets that may be used to receive transmissions over an LTE link and a set of antenna subsets that may be used to receive transmissions over a WLAN link. The available sets of antenna subsets may be identified based on restrictions associated with the links. The available sets of antenna subsets may include available subsets for receiving each link independently and both links concurrently. Antenna selection module 1115-a may be an example of antenna selection modules 1115 of FIG. 11 or FIG. 14.

Channel estimation module 1120-a may determine channel estimates for the multiple communication channels for the available subsets. For example, the channel estimation module 1120-a may determine a measurement window in which to receive reference or other signals of a link using all antennas and use the received signals to determine channel estimates of the link for each available antenna subset. Channel estimation module 1120-a may be an example of channel estimation modules 1120 of FIG. 11 or FIG. 14.

CQI reporting module 1125-a may report CQI to one or more of the base stations 1310 in multiflow operation with the UE 115-e. CQI reporting module 1125-a may determine the CQI to report based on a scheduling mode. For example, CQI reporting module 1125-a may report channel rates for each link using the best antenna subset for each link, channel rates based on the maximum sum capacity of the links using non-overlapping antenna subsets, or both.

The UE 115-e may receive transmissions from one or more of the multiple base stations 1310 based on the reported CQI. Antennas 235 of the UE 115-e may be selected by the antenna selection module 1115-a. Selection of the antenna subsets may be based on the scheduling mode and other information (e.g. downlink grants, etc.). In some embodiments, antenna selection module 1115-a, channel estimation module 1120-a, and CQI reporting module 1125-a may be implemented as components of MIMO detector 1356, receive processor 1358, processor 1380 and/or memory 1382.

On the uplink (UL), at the mobile device 115-e, a transmit (Tx) processor 1364 may receive and process data from a data source or a processor 1340 coupled with memory 1342. The transmit processor 1364 may also generate reference symbols for a reference signal. The symbols from the transmit processor 1364 may be precoded by a transmit (Tx) MIMO processor 1366 if applicable, further processed by the demodulators 1354-1 through 1354-n (e.g., for SC-FDMA, etc.), and be transmitted to the base station 1310 in accordance with the transmission parameters received from the base station 1310. At the base station 1310, the UL signals from the mobile device 115-e may be received by the antennas 1334, processed by the demodulators 1332, detected by a MIMO detector 1336 if applicable, and further processed by a receive (Rx) processor 1338. The receive processor 1338 may provide decoded data to a data output and to the processor 1340.

The components of the base station 1310 may, individually or collectively, be implemented with one or more Application Specific Integrated Circuits (ASICs) adapted to perform some or all of the applicable functions in hardware. Each of the noted modules may be a means for performing one or more functions related to operation of the system 1300. Similarly, the components of the mobile device 115-e may, individually or collectively, be implemented with one or more Application Specific Integrated Circuits (ASICs) adapted to perform some or all of the applicable functions in hardware. Each of the noted components may be a means for performing one or more functions related to operation of the system 1300.

Figure 14:
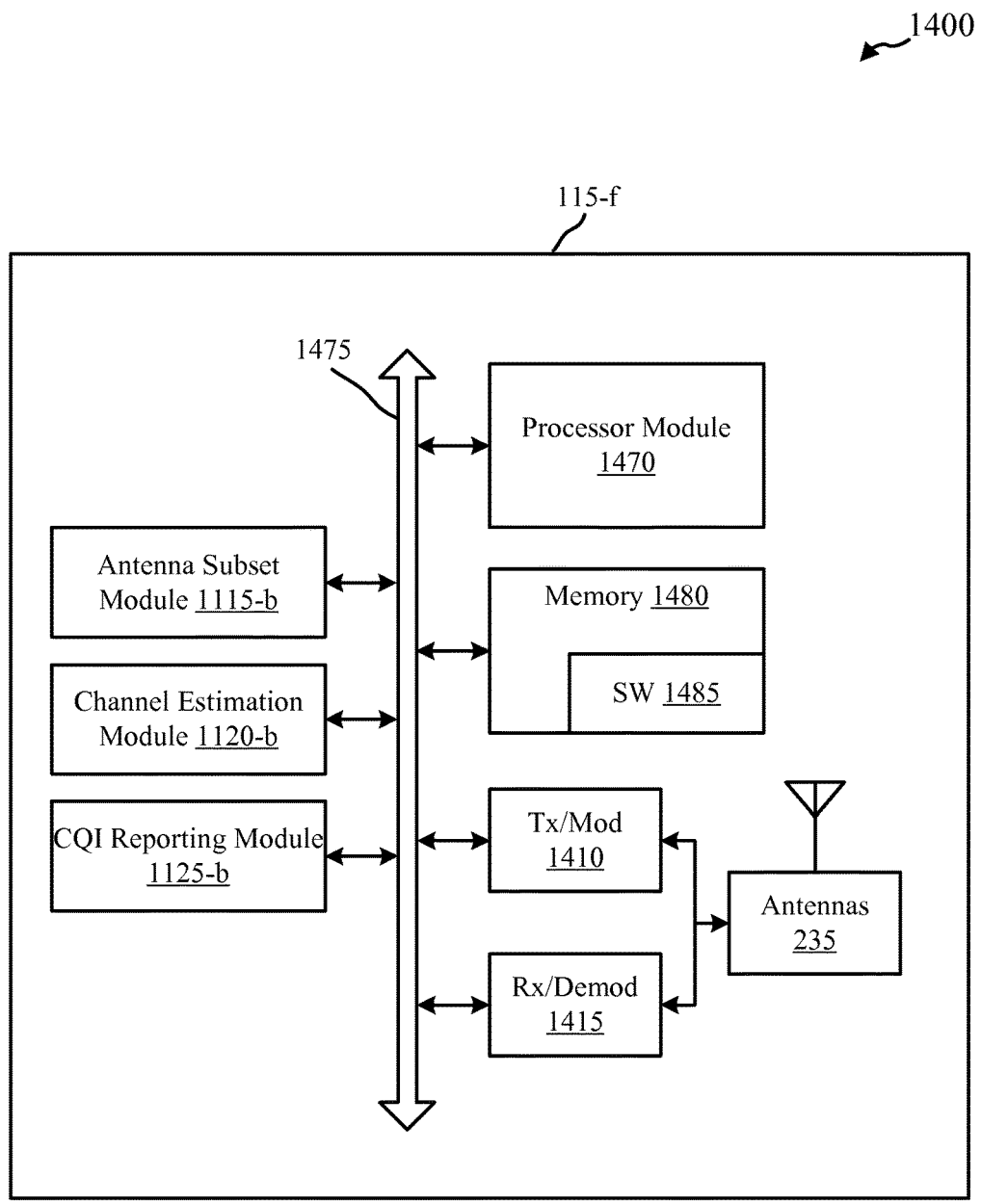
FIG. 14 shows a block diagram of a mobile device configured for antenna selection in multiflow operation.

FIG. 14 is a block diagram 1400 of a mobile device 115-f configured for antenna selection in multiflow operation according to various embodiments. The mobile device 115-f may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-*f* may have an internal power supply (not shown), such as a small battery, to facilitate mobile operation. In some embodiments, the mobile device 115-*f* may an example of the mobile devices 115 of FIG. 1, FIG. 2, FIG. 3, FIG. 6, FIG. 8 or FIG. 13.

The mobile device 115-*f* may generally include components for bi-directional voice and data communications including components for transmitting communications and components for receiving communications. The mobile device 115-*f* may include a processor module 1470, a memory 1480, transmitter/modulators 1410, receiver/demodulators 1415, and antennas 235, which each may communicate, directly or indirectly, with each other (e.g., via one or more buses 1475). The mobile device 115-*f* may include multiple antennas 235 capable of concurrently transmitting and/or receiving multiple wireless transmissions via transmitter/modulator modules 1410 and receiver/demodulator modules 1415. For example, the mobile device 115-*f* may have N antennas 235, T transmitter/modulator modules 1410, and R receiver/demodulators 1415. The transmitter/modulator modules 1410 may be configured to transmit signals via one or more of the antennas 235 to access points 105, 135 (e.g., LTE eNBs, WLAN APs, etc.). The transmitter/modulator modules 1410 may include a modem configured to modulate packets and provide the modulated packets to the antennas 235 for transmission. The receiver/demodulators 1415 may be configured to receive, perform RF processing, and demodulate packets received from one more of the antennas 235. In some examples, the mobile device 115-*f* may have one receiver/demodulator 1415 for each antenna 235 (i.e., R=N), while in other examples R may be less than or greater than N. The transmitter/modulators 1410 and receiver/demodulators 1415 may be capable of concurrently communicating with multiple base stations 105, 135 via multiple MIMO layers and/or component carriers.

According to the architecture of FIG. 14, the mobile device 115-*f* may also include antenna selection module 1115-*b*, channel estimation module 1120-*b*, and CQI reporting module 1125-*b*. By way of example, these modules may be components of the mobile device 115-*f* in communication with some or all of the other components of the mobile device 115-*f* via bus 1475. Alternatively, functionality of these modules may be implemented as a component of the transmitter/modulators 1410, the receiver/demodulators 1415, as a computer program product, and/or as one or more controller elements of the processor module 1470.

The memory 1480 may include random access memory (RAM) and read-only memory (ROM). The memory 1480 may store computer-readable, computer-executable software/firmware code 1485 containing instructions that are configured to, when executed, cause the processor module 1470 to perform various functions described herein (e.g., call processing, database management, antenna selection, etc.). Alternatively, the software/firmware code 1485 may not be directly executable by the processor module 1470 but be configured to cause a computer (e.g., when compiled and executed) to perform functions described herein.

The processor module 1470 may include an intelligent hardware device, e.g., a central processing unit (CPU), a microcontroller, an application-specific integrated circuit (ASIC), etc. The mobile device 115-*f* may include a speech encoder (not shown) configured to receive audio via a microphone, convert the audio into packets (e.g., 20 ms in length, 30 ms in length, etc.) representative of the received audio, provide the audio packets to the transmitter/modulator module 1410, and provide indications of whether a user is speaking.

The mobile device 115-*f* may be configured to implement aspects discussed above with respect to UEs 115 of FIG. 1, FIG. 2, FIG. 3, FIG. 6, FIG. 8 and FIG. 13, receiver 400 of FIG. 4, or device 1100 of FIG. 11 and may not be repeated here for the sake of brevity. Thus, the antenna selection module 1115-*b* may include the modules and functionality described above with reference to antenna selection modules 1115 of FIG. 11 or FIG. 13, channel estimation module 1120-*b*, may include the modules and functionality described above with reference to channel estimation modules 1120 of FIG. 11 or FIG. 13, and CQI reporting module 1125-*b* may include the modules and functionality described above with reference to CQI reporting module of FIG. 11 or FIG. 13.

Figure 15:
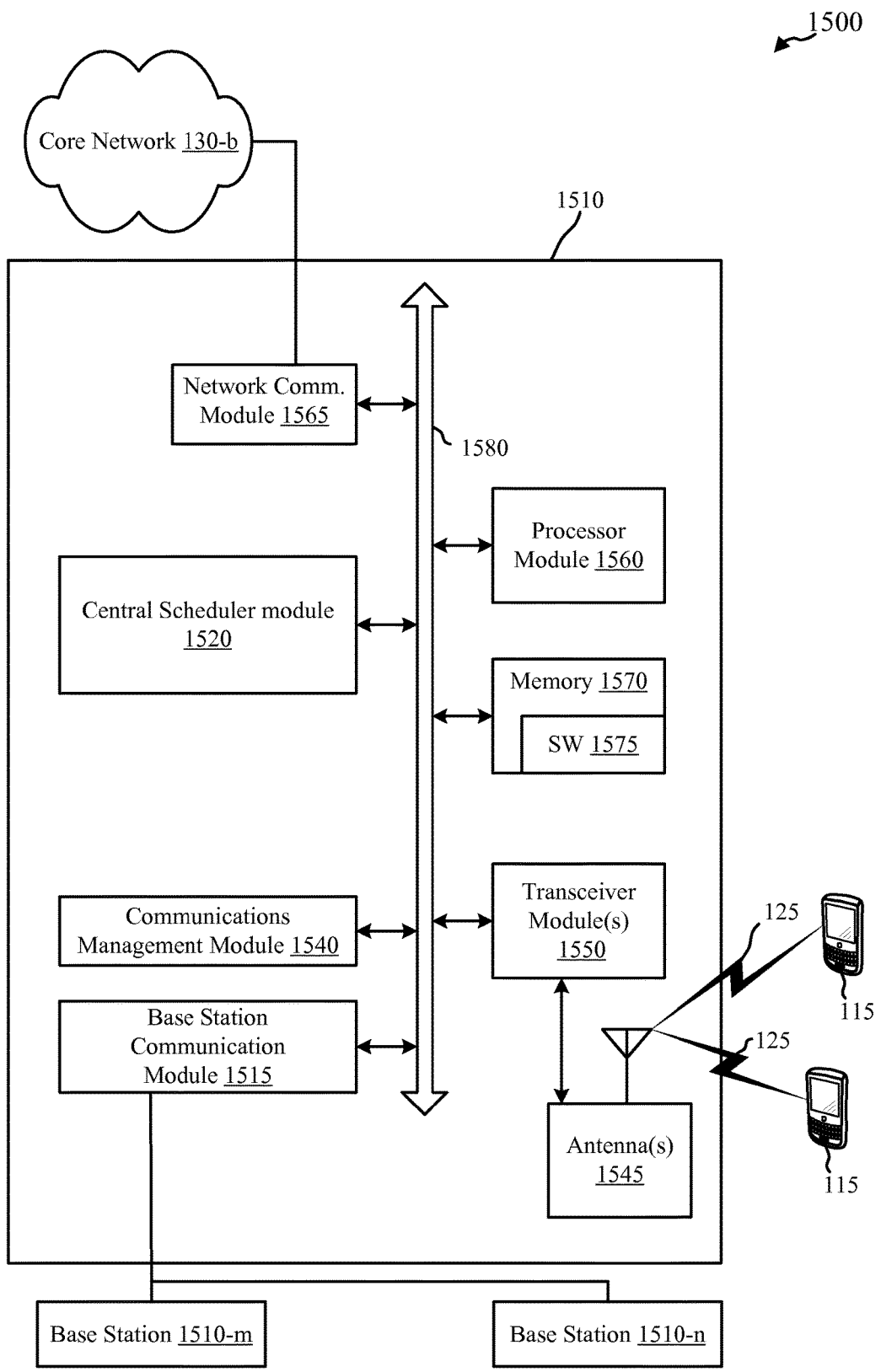
FIG. 15 shows a block diagram of a communications system that may be configured for multiflow operation using antenna selection.

FIG. 15 shows a block diagram of a communications system 1500 that may be configured for multiflow operation using antenna selection in accordance with various embodiments. This system 1500 may be an example of aspects of the systems 100, 200, or 300 depicted in FIG. 1, FIG. 2, or FIG. 3. The system 1500 includes a base station 1510 configured for communication with UEs 115 over wireless communication links 125. Base station 1510 may be capable of receiving communication links 125 from other base stations (not shown). Base station 1510 may be, for example, an LTE eNB 105 or WLAN AP 135 as illustrated in systems 100, 200, or 300.

In some cases, the base station 1510 may have one or more wired backhaul links. Base station 1510 may be, for example, an LTE eNB having a wired backhaul link (e.g., S1 interface, etc.) to the core network 130-*b*. Base station 1510 may also communicate with other base stations, such as base station 1510-*m* and base station 1510-*n* via inter-base station communication links (e.g., X2 interface, etc.). Each of the base stations 1510 may communicate with UEs 115 using the same or different wireless communications technologies. In some cases, base station 1510 may communicate with other base stations such as 1510-*m* and/or 1510-*n* utilizing base station communication module 1515. In some embodiments, base station communication module 1515 may provide an X2 interface within an LTE/LTE-A wireless communication network technology to provide communication between some of the base stations 1510. In some embodiments, base station 1510 may communicate with other base stations through core network 130-*b*. In some cases, the base station 1510 may communicate with the core network 130-*b* through network communications module 1565.

The components for base station 1510 may be configured to implement aspects discussed above with respect to access points 105, 135 (e.g., LTE eNBs, WLAN APs, etc.) and the central scheduler 320 and may not be repeated here for the sake of brevity. For example, base station 1510 may include central scheduler module 1520, which may be an example of central schedulers 320 of FIG. 3, FIG. 7, or FIG. 8.

The base station 1510 may include antennas 1545, transceiver modules 1550, memory 1570, and a processor module 1560, which each may be in communication, directly or indirectly, with each other (e.g., over bus system 1580). The transceiver modules 1550 may be configured to communicate bi-directionally, via the antennas 1545, with the UEs 115, which may be multi-mode devices. The transceiver module 1550 (and/or other components of the base station 1510) may also be configured to communicate bi-directionally, via the antennas 1545, with one or more other base stations (not shown). The transceiver module 1550 may include a modem configured to modulate the packets and provide the modulated packets to the antennas 1545 for transmission, and to demodulate packets received from the antennas 1545. The base station 1510 may include multiple transceiver modules 1550, each with one or more associated antennas 1545.

The memory 1570 may include random access memory (RAM) and read-only memory (ROM). The memory 1570 may also store computer-readable, computer-executable software code 1575 containing instructions that are configured to, when executed, cause the processor module 1560 to perform various functions described herein (e.g., call processing, database management, message routing, etc.). Alternatively, the software 1575 may not be directly executable by the processor module 1560 but be configured to cause the computer, e.g., when compiled and executed, to perform functions described herein.

The processor module 1560 may include an intelligent hardware device, e.g., a central processing unit (CPU), a microcontroller, an application-specific integrated circuit (ASIC), etc. The processor module 1560 may include various special purpose processors such as encoders, queue processing modules, base band processors, radio head controllers, digital signal processors (DSPs), and the like.

According to the architecture of FIG. 15, the base station 1510 may further include a communications management module 1540. The communications management module 1540 may manage communications with other base stations 1510. The communications management module may include a controller and/or scheduler for controlling communications with UEs 115 in cooperation with other base stations 1510. For example, the communications management module 1540 may perform scheduling for transmissions to UEs 115 and/or various interference mitigation techniques such as beamforming and/or joint transmission.

Figure 16:
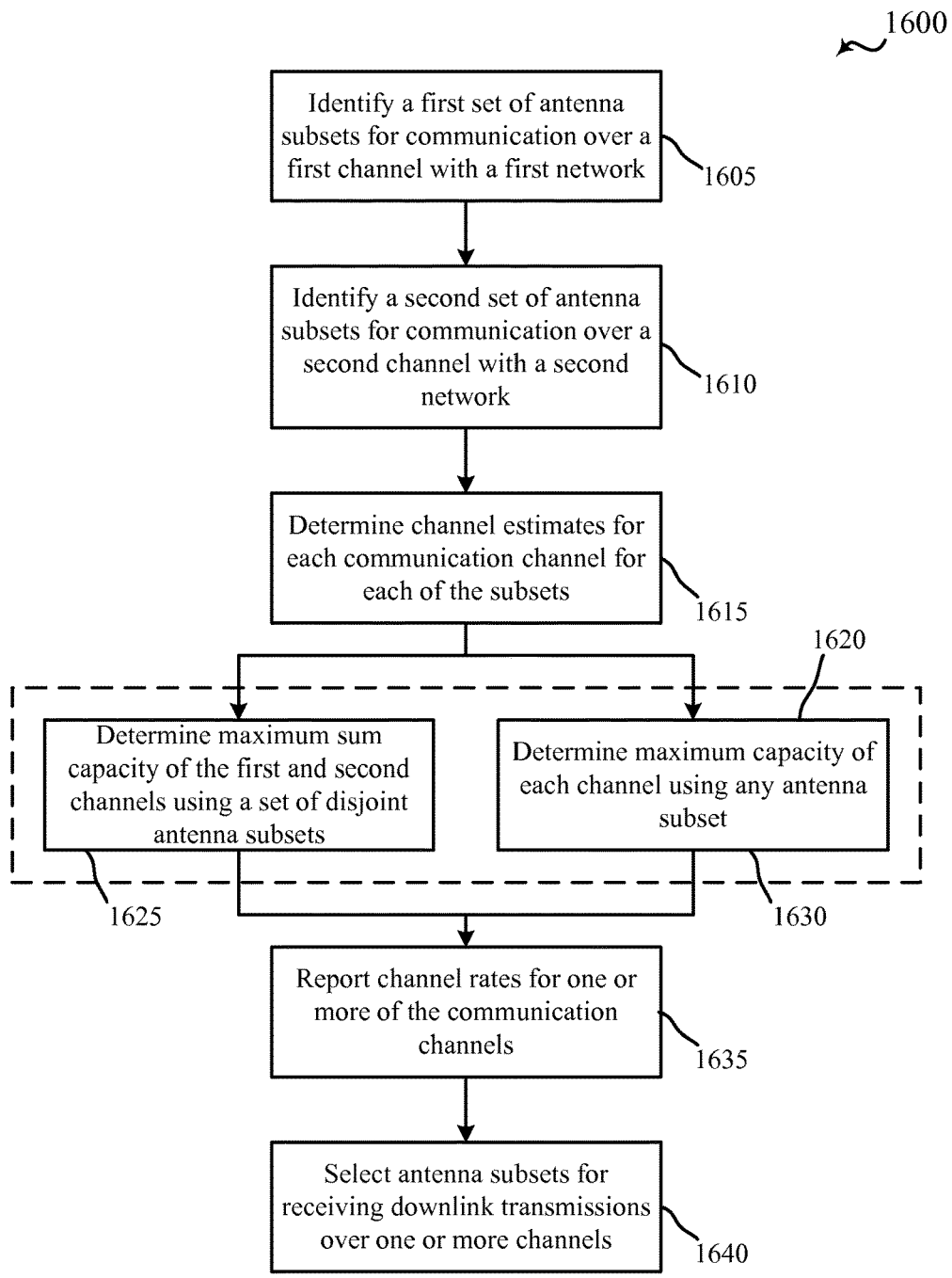
FIG. 16 shows a flow diagram of an example method for antenna selection and CQI reporting in multiflow operation according to various embodiments.

FIG. 16 illustrates a flow diagram of an example method 1600 for antenna selection and CQI reporting in multiflow operation according to various embodiments. The method 1600 may be performed using, for example, the UEs 115 of FIG. 1, FIG. 2, FIG. 3, FIG. 6, FIG. 8, FIG. 13, or FIG. 14, or the receiver 400 of FIG. 4.

At block 1605, the UE 115 may identify a first set of antenna subsets for communication over a first channel with a first network. For example, the UE 115 may identify a first set of antenna subsets that may be used to receive transmissions from an LTE eNB 105. At block 1610, the UE 115 may identify a second set of antenna subsets for communication over a second channel with a second network. For example, the UE 115 may identify a second set of antenna subsets that may be used to receive transmissions from a WLAN AP 135. The first and second sets of antenna subsets may be identified based on restrictions associated with the links. The first and second sets of antenna subsets may include available subsets for receiving each link independently and both links concurrently At block 1615, the UE 115 may determine channel estimates for each of the first and second communication channels for the identified subsets. For example, the UE 115 may determine a measurement window in which to receive reference or other signals of a link using all antennas and use the received signals to determine channel estimates of the link for each available antenna subset.

At block 1620, the UE may determine channel rates for the first and second communication channels. For example, the UE may determine channel capacities for each of the first and second communication channels for a set of antenna configurations with non-overlapping antenna subsets at block 1625. The UE 115 may determine the antenna configuration from the set having the highest maximum sum capacity. The UE 115 may take into account the loading of the first and second networks when determining the maximum sum capacity. For example, the UE 115 may weight the calculated capacity for each link based on the estimated use of the link (e.g., based on recent scheduling on the links, etc.). Additionally or alternatively, the UE 115 may determine channel capacities of the links independent of other links at block 1630. For example, the UE 115 may determine the highest supported rate of each link using any available antenna subset up to and including all receive antennas.

At block 1635, the UE 115 may report channel rates for the first and second communication channels to one or more of the first and second networks. The reported channel rates may be based on a scheduling mode. For example, the UE 115 may report channel rates for each link using the best antenna subset for each link, channel rates based on the maximum sum capacity of the links using non-overlapping antenna subsets, or both, depending on scheduling mode as described above with reference to FIG. 8.

At block 1640, the UE 115 may select one or more antenna subsets for receiving downlink transmissions over the first channel, second channel, or both first and second channels concurrently. Selection of the antenna subsets may be based on the scheduling mode and other information (e.g. downlink grants, etc.).

Figure 17:
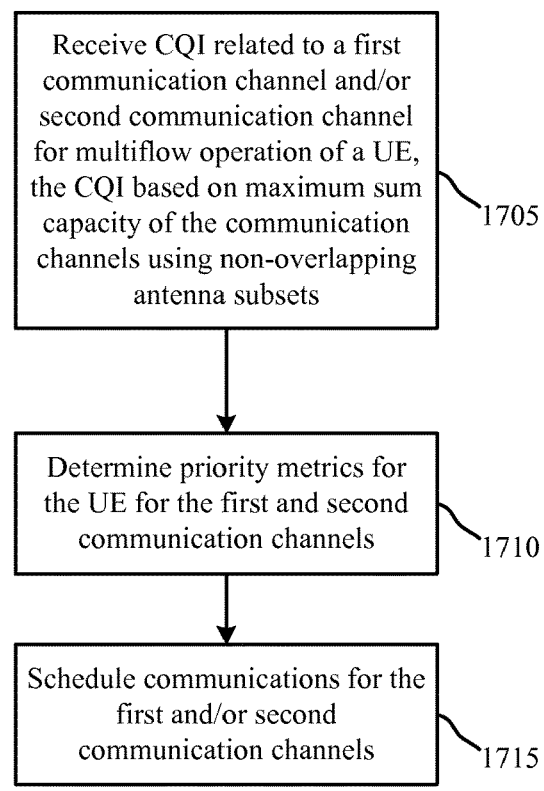
FIG. 17 shows a flow diagram of an example method for scheduling with antenna selection in multiflow operation.

FIG. 17 illustrates a flow diagram of an example method 1700 for scheduling with antenna selection in multiflow operation according to various embodiments. The method 1700 may be performed using, for example, the central schedulers 320 of FIG. 3 or FIG. 7.

At block 1705, the central scheduler 320 may receive channel rates related to a first communication channel and/or second communication channel for multiflow operation of a UE with first and second access points. The channel rates may be based on the maximum sum capacity of the communication channels using non-overlapping antenna subsets.

At block 1710, the central scheduler 320 may determine priority metrics for scheduling the first and second links. In a first scheduling mode the scheduler may determine separate priorities for the first and second links based on the reported communication rates. For example, the central scheduler 320 may determine a priority metric for each UE for each of the LTE and WLAN networks. In a second scheduling mode, the central scheduler 320 may maintain a single priority list across both links and may perform wideband scheduling across the access points.

At block 1715, the central scheduler 320 may schedule communications between at least one of the first access point or the second access point and the UE based on the determined scheduling priority metrics.

Figure 18:
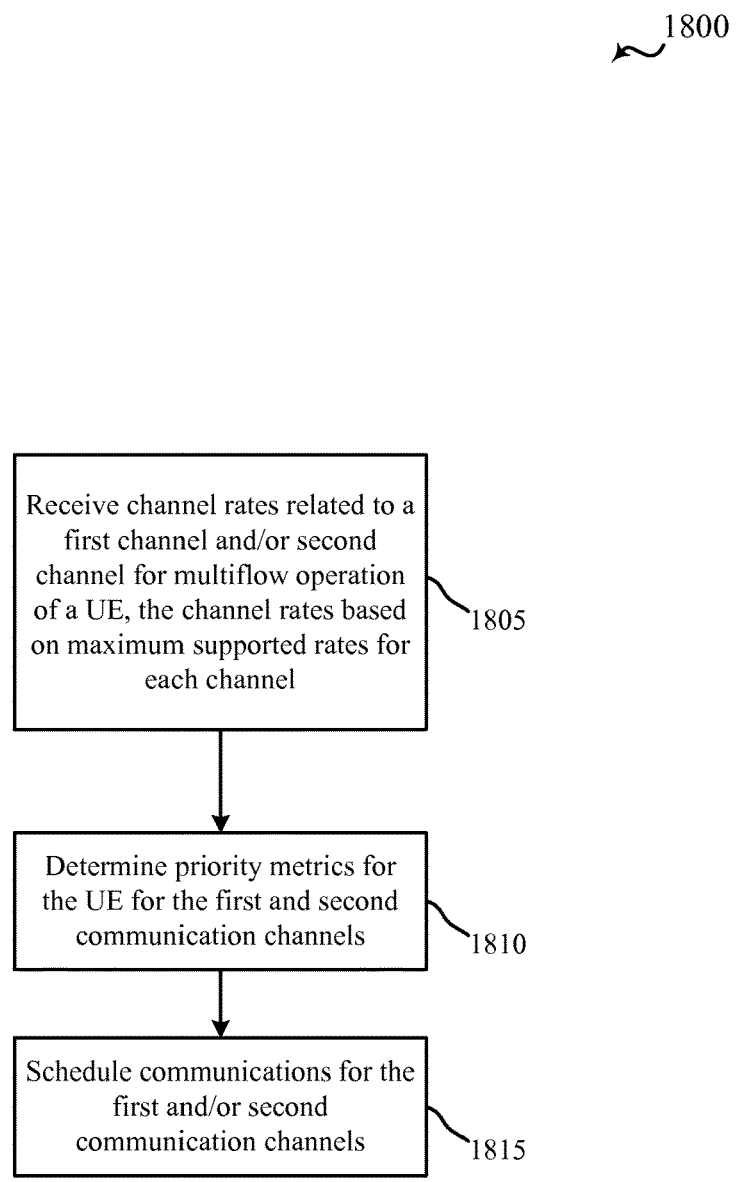
FIG. 18 shows a flow diagram of an example method for scheduling with antenna selection in multiflow operation.

FIG. 18 illustrates a flow diagram of an example method 1800 for scheduling with antenna selection in multiflow operation according to various embodiments. The method 1800 may be performed using, for example, the central schedulers 320 of FIG. 3 or FIG. 7.

At block 1805, central scheduler 320 may receive channel rates related to a first communication channel and/or second communication channel for multiflow operation of a UE with first and second access points. The channel rates may indicate the maximum supported rates for each channel using any available antenna subset (e.g., up to and including all antennas).

At block 1810, the central scheduler 320 may determine priority metrics for scheduling the first and second links. In a third scheduling mode, the central scheduler 320 may use orthogonal scheduling between the access points. For example, the central scheduler 320 may maintain independent priority metrics for each access point and may ensure that the UE is not simultaneously scheduled on both the first and the second channels.

At block 1815, the central scheduler 320 may schedule communications between at least one of the first access point or the second access point and the UE based on the determined scheduling priority metrics.

Figure 19:
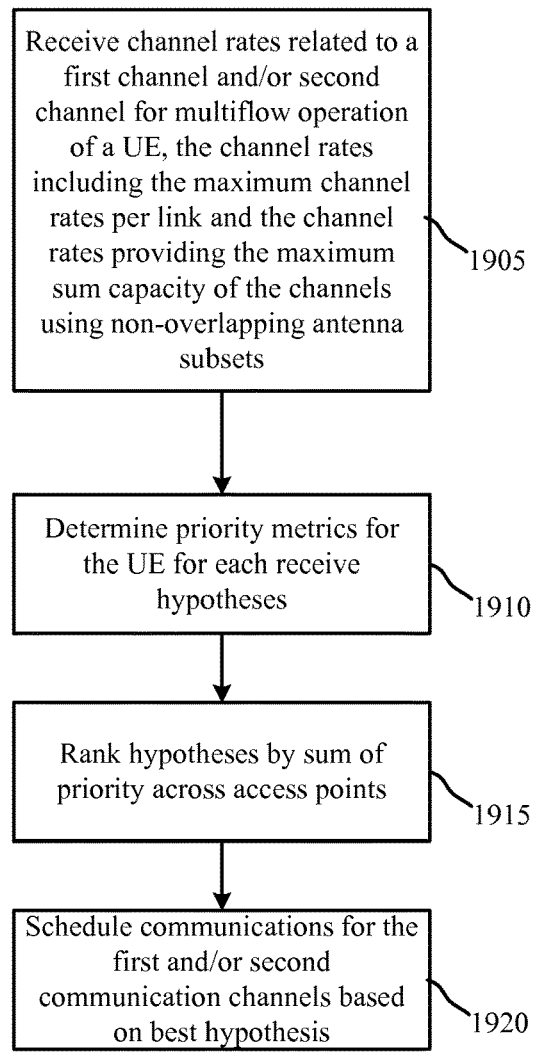
FIG. 19 shows a flow diagram of an example method for scheduling with antenna selection in multiflow operation.

FIG. 19 illustrates a flow diagram of an example method 1900 for scheduling with antenna selection in multiflow operation according to various embodiments. The method 1900 may be performed using, for example, the central schedulers 320 of FIG. 3 or FIG. 7.

At block 1905, the central scheduler 320 may receive channel rates related to a first channel and/or second channel for multiflow operation of a UE with first and second access points. The channel rates may include the maximum channel rates per link and the channel rates providing the maximum sum capacity of the channels using non-overlapping antenna subsets.

At block 1910, the central scheduler 320 may determine priority metrics for the UE. In a fourth scheduling mode, the central scheduler 320 maintains individual priority lists for the first and second access points and schedules UEs based on optimizing multiflow performance taking into account the supported communication rates for each of three receive hypotheses for each UE: using the first channel only, using the second channel only, or using both channels at the same time. At block 1915, the central scheduler 320 may rank the receive hypotheses by sum of priority across the access points.

At block 1920, the central scheduler 320 may schedule communications between at least one of the first access point or the second access point and the UE based on the determined scheduling priority metrics. One or more of the access points may signal the receive configuration to the UE for a particular transmission interval.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, instructions, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other transitory or non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

The invention claimed is:

1. A method for communication performed by a user equipment having two or more antennas, the method comprising:
   identifying a first set of antenna subsets of the two or more antennas for communication with a first access point over a first communication channel;
   identifying a second set of antenna subsets of the two or more antennas for communication with a second access point over a second communication channel;
   determining channel estimates for the first communication channel for the first set of antenna subsets and for the second communication channel for the second set of antenna subsets;
   identifying, based at least in part on the determined channel estimates, a maximum sum capacity of a combination of a first channel rate for the first communication channel and a second channel rate for the second communication channel, wherein the first channel rate is based at least in part on a first antenna subset from the first set of antenna subsets and the second channel rate is based at least in part on a second antenna subset from the second set of antenna subsets, the first antenna subset and the second antenna subset comprising non-overlapping subsets;
   reporting channel rate information based at least in part on the identified maximum sum capacity; and
   receiving at least one transmission over at least one of the first communication channel or the second communication channel based on the reported channel rate information.

2. The method of claim 1, wherein the channel rate information comprises at least one of:
   the first channel rate;
   the second channel rate;
   a third channel rate based on a maximum rate of the first communication channel and the first set of antenna subsets; or
   a fourth channel rate based on a maximum rate of the second communication channel and the second set of antenna subsets.

3. The method of claim 1, further comprising:
   determining a first loading weight for the first access point and a second loading weight for the second access point; and
   identifying the maximum sum capacity of the combination of the first and second channel rates based at least in part on the first and second loading weights.

4. The method of claim 2, wherein the reporting comprises reporting the third channel rate for the first communication channel to the first access point, the third channel rate for the first communication channel associated with a third antenna subset associated with the maximum rate of the first communication channel, and wherein the receiving the at least one transmission comprises:
   receiving transmissions from the first access point in first time intervals using the third antenna subset; and
   receiving transmissions from the second access point in second time intervals different from the first time intervals using a fourth antenna subset associated with the maximum rate of the second communication channel.

5. The method of claim 2, wherein the reporting comprises:
   reporting the first channel rate and the third channel rate of the first communication channel to the first access point.

6. The method of claim 2, wherein the reporting comprises:
   reporting the second channel rate and the fourth channel rate of the second communication channel to the second access point.

7. The method of claim 1, wherein the receiving the at least one transmission comprises:
   receiving an antenna selection indicator from the first access point, the antenna selection indicator indicating one of an antenna receive configuration, an antenna subset index, or an antenna subset size, or a combination thereof; and
   determining an antenna subset for receiving the at least one transmission based at least in part on the antenna selection indicator.

8. The method of claim 7, wherein the antenna selection indicator is received in one of control information or a configuration message.

9. The method of claim 1, further comprising:
   sending an indicator of a capability of receiving the first communication channel using the first antenna subset and the second communication channel using the second antenna subset concurrently.

10. The method of claim 1, wherein the first access point comprises a Long Term Evolution (LTE)/LTE-Advanced (LTE-A) evolved NodeB (eNB) and the second access point comprises a wireless local area network (WLAN) access point.

11. A method, comprising:
    receiving channel rate information for a first communication channel between a first access point and a user equipment (UE) and a second communication channel between a second access point and the UE, wherein the channel rate information comprises:
    at least one of a first channel rate based on a maximum rate for the first communication channel or a second channel rate based on a maximum rate for the second communication channel; and
    at least one of a third channel rate of the first communication channel or a fourth channel rate of the second communication channel, wherein the third channel rate and fourth channel rate are based on a maximum sum capacity of a combination of channel rates of the first and second communication channels using a first antenna subset and a second, different antenna subset, respectively;
    determining a scheduling priority metric for the UE for the first and second communication channels based at least in part on the received channel rate information; and
    scheduling communications between at least one of the first access point or the second access point and the UE based on the determined scheduling priority metric.

12. The method of claim 11, wherein the received channel rate information comprises the third channel rate for the first communication channel, and wherein determining the scheduling priority metric comprises determining a first scheduling priority metric for the UE for the first access point and determining a second scheduling priority metric for the UE for the second access point independently of the first scheduling priority metric.

13. The method of claim 11, wherein the received channel rate information comprises the third channel rate for the first communication channel, and wherein the scheduling comprises scheduling communications between the first and second access points and the UE simultaneously.

14. The method of claim 11, wherein the received channel rate information comprises the first channel rate for the first communication channel, and wherein the scheduling comprises scheduling communications between the first and second access points and the UE using orthogonal resources.

15. The method of claim 11, wherein the received channel rate information comprises the first channel rate and the third channel rate for the first communication channel, and wherein determining the scheduling priority metric for the UE comprises determining, for each of the first and second access points, a first scheduling priority metric for the first communication channel, a second scheduling priority metric for the second communication channel, and a third scheduling priority metric for concurrent use of the first and second communication channels.

16. The method of claim 11, further comprising:
identifying an antenna subset metric for the UE for receiving the scheduled communications, the antenna subset metric comprising one of an antenna receive configuration, an antenna subset index, or an antenna subset size, or a combination thereof; and
sending the antenna subset metric to the UE for antenna selection for the scheduled communications.

17. The method of claim 11, further comprising:
receiving an indicator of a capability of receiving the first communication channel using the first antenna subset and the second communication channel using the second antenna subset concurrently.

18. An apparatus for wireless communication having two or more antennas, the apparatus comprising:
means for identifying first and second sets of antenna subsets of the two or more antennas, the first and second sets of antenna subsets for communication with a first access point over a first communication channel and with a second access point over a second communication channel, respectively;
means for determining channel estimates for the first communication channel for the first set of antenna subsets and for the second communication channel for the second set of antenna subsets;
means for identifying, based at least in part on the determined channel estimates, a maximum sum capacity of a combination of a first channel rate for the first communication channel and a second channel rate for the second communication channel, wherein the first channel rate is based at least in part on a first antenna subset from the first set of antenna subsets and the second channel rate is based at least in part on a second antenna subset from the second set of antenna subsets, the first antenna subset and the second antenna subset comprising non-overlapping subsets;
means for reporting channel rate information based at least in part on the identified maximum sum capacity; and
means for receiving at least one transmission over at least one of the first communication channel or the second communication channel based on the reported channel rate information.

19. The apparatus of claim 18, wherein the channel rate information comprises at least one of:
the first channel rate;
the second channel rate;
a third channel rate based on a maximum rate for the first communication channel using an antenna subset of the first set of antenna subsets; or
a fourth channel rate based on a maximum rate for the second communication channel using an antenna subset of the second set of antenna subsets.

20. The apparatus of claim 18, further comprising:
means for determining a first loading weight for the first access point and a second loading weight for the second access point; and
means for identifying the combination of the maximum sum capacity of the first and second channel rates based on the first and second loading weights.

21. The apparatus of claim 19, wherein the means for reporting reports the third channel rate for the first communication channel to the first access point, the third channel rate for the first communication channel associated with a third antenna subset, and wherein the means for receiving the at least one transmission receives transmissions from the first access point in first time intervals using the third antenna subset, and receives transmissions from the second access point in second time intervals different from the first time intervals using a fourth antenna subset associated with the maximum rate of the second communication channel.

22. The apparatus of claim 19, wherein the means for reporting reports the first channel rate and the third channel rate of the first communication channel to the first access point.

23. The apparatus of claim 18, wherein the means for receiving the at least one transmission receives an antenna selection indicator from the first access point, the antenna selection indicator indicating one of an antenna receive configuration, an antenna subset index, or an antenna subset size, or a combination thereof, and wherein the means for identifying the first and second antenna subsets determines an antenna subset for receiving the at least one transmission based at least in part on the antenna selection indicator.

24. The apparatus of claim 23, wherein the antenna selection indicator is received in one of control information or a configuration message.

25. The apparatus of claim 18, further comprising:
means for sending an indicator of a capability of receiving the first communication channel using the first antenna subset and the second communication channel using the second antenna subset concurrently.

26. The apparatus of claim 18, wherein the first access point comprises a Long Term Evolution (LTE)/LTE-Advanced (LTE-A) evolved NodeB (eNB) and the second access point comprises a wireless local area network (WLAN) access point.

27. An apparatus for wireless communication, comprising:
means for receiving channel rate information for a first communication channel between a first access point and a user equipment (UE) and a second communication channel between a second access point and the UE, wherein the channel rate information comprises:
at least one of a first channel rate based on a maximum rate for the first communication channel or a second channel rate based on a maximum rate for the second communication channel; and
at least one of a third channel rate of the first communication channel or a fourth channel rate of the second communication channel, wherein the third channel rate and fourth channel rate are based on a maximum sum capacity of a combination of channel rates of the first and second communication channels using a first antenna subset and a second, different antenna subset, respectively;

means for determining a scheduling priority metric for the UE for the first and second communication channels based at least in part on the received channel rate information; and means for scheduling communications between at least one of the first access point or the second access point and the UE based on the determined scheduling priority metric.

28. The apparatus of claim 27, wherein the received channel rate information comprises the third channel rate for the first communication channel, and wherein the means for determining the scheduling priority metric determines a first scheduling priority metric for the UE for the first access point and determines a second scheduling priority metric for the UE for the second access point independently of the first scheduling priority metric.

29. The apparatus of claim 27, wherein the received channel rate information comprises the third channel rate for the first communication channel, and wherein the means for scheduling schedules communications between the first and second access points and the UE simultaneously.

30. The apparatus of claim 27, wherein the received channel rate information comprises the first channel rate for the first communication channel, and wherein the means for scheduling schedules communications between the first and second access points and the UE using orthogonal resources.

31. The apparatus of claim 27, wherein the received channel rate information comprises the first channel rate and the third channel rate for the first communication channel, and wherein the means for determining the scheduling priority metric for the UE determines, for each of the first and second access points, a first scheduling priority metric for the first communication channel, a second scheduling priority metric for the second communication channel, and a third scheduling priority metric for concurrent use of the first and second communication channels.

32. The apparatus of claim 27, further comprising:
means for identifying an antenna subset metric for the UE for receiving the scheduled communications, the antenna subset metric comprising one of an antenna receive configuration, an antenna subset index, or an antenna subset size, or a combination thereof; and
means for sending the antenna subset metric to the UE for antenna selection for the scheduled communications.

33. The apparatus of claim 27, wherein the means for receiving receives an indicator of a capability of receiving the first communication channel using the first antenna subset and the second communication channel using the second antenna subset concurrently.

34. A device for wireless communication having two or more antennas, comprising:
a processor; and
a memory in electronic communication with the processor, the memory embodying instructions, the instructions being executable by the processor to:
identify a first set of antenna subsets for communication with a first access point over a first communication channel;
identify a second set of antenna subsets of the two or more antennas for communication with a second access point over a second communication channel;
determine channel estimates for the first communication channel for the first set of antenna subsets and for the second communication channel for the second set of antenna subsets;
identify, based at least in part on the determined channel estimates, a maximum sum capacity of a combination of a first channel rate for the first communication channel and a second channel rate for the second communication channel, wherein the first channel rate is based at least in part on a first antenna subset from the first set of antenna subsets and the second channel rate is based at least in part on a second antenna subset from the second set of antenna subsets, the first antenna subset and the second antenna subset comprising non-overlapping subsets;
report channel rate information based at least in part on the identified maximum sum capacity; and
receive at least one transmission over at least one of the first communication channel or the second communication channel based on the reported channel rate information.

35. The device of claim 34, the memory further embodying instructions being executable by the processor to report at least one of:
the first channel rate;
the second channel rate;
a third channel rate based on a maximum rate of the first communication channel and the first set of antenna subsets; or
a fourth channel rate based on a maximum rate of the second communication channel and the second set of antenna subsets.

36. The device of claim 34, the memory further embodying instructions being executable by the processor to:
determine a first loading weight for the first access point and a second loading weight for the second access point; and
identify the maximum sum capacity of the combination of the first and second channel rates based on the first and second loading weights.

37. The device of claim 35, the memory further embodying instructions being executable by the processor to:
report the third channel rate for the first communication channel to the first access point, the third channel rate for the first communication channel associated with a third antenna subset associated with the maximum rate of the first communication channel;
receive transmissions from the first access point in first time intervals using the third antenna subset; and
receive transmissions from the second access point in second time intervals different from the first time intervals using a fourth antenna subset associated with the maximum rate of the second communication channel.

38. The device of claim 35, the memory further embodying instructions being executable by the processor to:
report the first channel rate and the third channel rate of the first communication channel to the first access point.

39. The device of claim 34, the memory further embodying instructions being executable by the processor to:
receive an antenna selection indicator from the first access point, the antenna selection indicator indicating one of an antenna receive configuration, an antenna subset index, or an antenna subset size, or a combination thereof; and
determine an antenna subset for receiving the at least one transmission based at least in part on the antenna selection indicator.

40. A device for wireless communication, comprising:
a processor; and
a memory in electronic communication with the processor, the memory embodying instructions, the instructions being executable by the processor to:
receive channel rate information for a first communication channel between a first access point and a user equipment (UE) and a second communication channel between a second access point and the UE, wherein the channel rate information comprises:
at least one of a first channel rate based on a maximum rate for the first communication channel or a second channel rate based on a maximum rate for the second communication channel; and
at least one of a third channel rate of the first communication channel or a fourth channel rate of the second communication channel, wherein the third channel rate and fourth channel rate are based on a maximum sum capacity of a combination of channel rates of the first and second communication channels using a first antenna subset and a second, different antenna subset, respectively;
determine a scheduling priority metric for the UE for the first and second communication channels based at least in part on the received channel rate information; and
schedule communications between at least one of the first access point or the second access point and the UE based on the determined scheduling priority metric.

41. The device of claim 40, wherein the received channel rate information comprises the third channel rate for the first communication channel, and wherein the memory further embodies instructions being executable by the processor to determine a first scheduling priority metric for the UE for the first access point and determine a second scheduling priority metric for the UE for the second access point independently of the first scheduling priority metric.

42. The device of claim 40, wherein the received channel rate information comprises the third channel rate for the first communication channel, and wherein the memory further embodies instructions being executable by the processor to schedule communications between the first and second access points and the UE simultaneously.

43. The device of claim 40, wherein the received channel rate information comprises the first channel rate for the first communication channel, and wherein the memory further embodies instructions being executable by the processor to schedule communications between the first and second access points and the UE using orthogonal resources.

44. The device of claim 40, wherein the received channel rate information comprises the first channel rate and the third channel rate for the first communication channel, and wherein the memory further embodies instructions being executable by the processor to determine, for each of the first and second access points, a first scheduling priority metric for the first communication channel, a second scheduling priority metric for the second communication channel, and a third scheduling priority metric for concurrent use of the first and second communication channels.

45. The device of claim 40, the memory further embodying instructions being executable by the processor to:
identify an antenna subset metric for the UE for receiving the scheduled communications, the antenna subset metric comprising one of an antenna receive configuration, an antenna subset index, or an antenna subset size, or a combination thereof; and
send the antenna subset metric to the UE for antenna selection for the scheduled communications.

46. A computer program product for wireless communication, comprising:
a non-transitory computer-readable medium, comprising code for:
identifying, for a user equipment (UE) having two or more antennas, a first set of antenna subsets of the two or more antennas for communication with a first access point over a first communication channel;
identifying a second set of antenna subsets of the two or more antennas for communication with a second access point over a second communication channel;
determining channel estimates for the first communication channel for the first set of antenna subsets and for the second communication channel for the second set of antenna subsets;
identifying, based at least in part on the determined channel estimates, a maximum sum capacity of a combination of a first channel rate for the first communication channel and a second channel rate for the second communication channel, wherein the first channel rate is based at least in part on a first antenna subset from the first set of antenna subsets and the second channel rate is based at least in part on a second antenna subset from the second set of antenna subsets, the first antenna subset and the second antenna subset comprising non-overlapping subsets;
reporting channel rate information based at least in part on the identified maximum sum capacity; and
receiving at least one transmission over at least one of the first communication channel or the second communication channel based on the reported channel rate information.

47. The computer program product of claim 46, wherein the non-transitory computer-readable medium further comprises code for reporting at least one of:
the first channel rate;
the second channel rate;
a third channel rate based on a maximum rate of the first communication channel and the first set of antenna subsets; or
a fourth channel rate based on a maximum rate of the second communication channel and the second set of antenna subsets.

48. The computer program product of claim 46, wherein the non-transitory computer-readable medium further comprises code for:
determining a first loading weight for the first access point and a second loading weight for the second access point; and
identifying the maximum sum capacity of the combination of the first and second channel rates based on the first and second loading weights.

49. The computer program product of claim 47, wherein the non-transitory computer-readable medium further comprises code for:
reporting the third channel rate for the first communication channel to the first access point, the third channel rate for the first communication channel associated with a third antenna subset associated with the maximum rate of the first communication channel;
receiving transmissions from the first access point in first time intervals using the third antenna subset; and
receiving transmissions from the second access point in second time intervals different from the first time intervals using a fourth antenna subset associated with the maximum rate of the second communication channel.

50. The computer program product of claim 47, wherein the non-transitory computer-readable medium further comprises code for:
reporting the first channel rate and the third channel rate of the first communication channel to the first access point.

51. The computer program product of claim 46, wherein the non-transitory computer-readable medium further comprises code for:
receiving an antenna selection indicator from the first access point, the antenna selection indicator indicating one of an antenna receive configuration, an antenna subset index, or an antenna subset size, or a combination thereof; and
determining an antenna subset for receiving the at least one transmission based at least in part on the antenna selection indicator.

52. A computer program product for wireless communication, comprising:
a non-transitory computer-readable medium, comprising code for:
receiving channel rate information for a first communication channel between a first access point and a user equipment (UE) and a second communication channel between a second access point and the UE, wherein the channel rate information comprises:
at least one of a first channel rate based on a maximum rate for the first communication channel or a second channel rate based on a maximum rate for the second communication channel; and
at least one of a third channel rate of the first communication channel or a fourth channel rate of the second communication channel, wherein the third channel rate and fourth channel rate are based on a maximum sum capacity of a combination of channel rates of the first and second communication channels using a first antenna subset and a second, different antenna subset, respectively;
determining a scheduling priority metric for the UE for the first and second communication channels based at least in part on the received channel rate information; and
scheduling communications between at least one of the first access point or the second access point and the UE based on the determined scheduling priority metric.

53. The computer program product of claim 52, wherein the received channel rate information comprises the third channel rate for the first communication channel, and wherein the computer-readable medium further comprises code for determining a first scheduling priority metric for the UE for the first access point and determining a second scheduling priority metric for the UE for the second access point independently of the first scheduling priority metric.

54. The computer program product of claim 52, wherein the received channel rate information comprises the third channel rate for the first communication channel, and wherein the computer-readable medium further comprises code for scheduling communications between the first and second access points and the UE simultaneously.

55. The computer program product of claim 52, wherein the received channel rate information comprises the first channel rate for the first communication channel, and wherein the computer-readable medium further comprises code for scheduling communications between the first and second access points and the UE using orthogonal resources.

56. The computer program product of claim 52, wherein the received channel rate information comprises the first channel rate and the third channel rate for the first communication channel, and wherein the computer-readable medium further comprises code for determining, for each of the first and second access points, a first scheduling priority metric for the first communication channel, a second scheduling priority metric for the second communication channel, and a third scheduling priority metric for concurrent use of the first and second communication channels.

57. The computer program product of claim 52, wherein the non-transitory computer-readable medium further comprises code for:
identifying an antenna subset metric for the UE for receiving the scheduled communications, the antenna subset metric comprising one of an antenna receive configuration, an antenna subset index, or an antenna subset size, or a combination thereof; and
sending the antenna subset metric to the UE for antenna selection for the scheduled communications.

* * * * *